United States Patent
Sato et al.

(10) Patent No.: US 7,137,191 B2
(45) Date of Patent: Nov. 21, 2006

(54) METHOD FOR MANUFACTURING MAGNETIC HEAD

(75) Inventors: Kiyoshi Sato, Niigata-ken (JP); Kiyoshi Kobayashi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 209 days.

(21) Appl. No.: 10/988,456

(22) Filed: Nov. 12, 2004

(65) Prior Publication Data

US 2005/0115058 A1 Jun. 2, 2005

(30) Foreign Application Priority Data

Nov. 20, 2003 (JP) ............................. 2003-390098

(51) Int. Cl.
*G11B 5/187* (2006.01)
*B24B 1/00* (2006.01)

(52) U.S. Cl. ............................. 29/603.12; 29/603.23; 29/603.11; 451/28; 360/122; 360/123; 360/126

(58) Field of Classification Search ............. 29/603.12, 29/603.13, 603.15, 603.16, 603.18, 603.23, 29/603.25, 603.11; 451/28, 41; 360/119, 360/122, 123, 126
See application file for complete search history.

(56) References Cited

U.S. PATENT DOCUMENTS 6,430,003 B1 * 8/2002 Sasaki ................. 29/603.15 X

FOREIGN PATENT DOCUMENTS

| JP | 7-272211 | | 10/1995 |
| JP | 11-161915 | * | 6/1999 |
| JP | 11-232609 | | 8/1999 |

OTHER PUBLICATIONS

Park et al., "A Sacrificial Layer Approach to Highly Laminated Magnetic Cores", The 5th IEEE International Conference of Micro Electro Mechanical Systems, Jan. 20-24, 2002, pp. 380-383.*

* cited by examiner

*Primary Examiner*—A. Dexter Tugbang
(74) *Attorney, Agent, or Firm*—Brinks Hofer Gilson & Lione

(57) ABSTRACT

A first insulating layer is formed on a main magnetic pole used as a magnetic pole layer to have a protruding portion and a flat portion formed around the protruding portion. A second insulating layer is formed on the flat portion, and then the protruding portion of the first insulating layer is cut to expose the upper surface of the main magnetic pole and to form the same planarized surface including the upper surfaces of the main magnetic pole and the second insulating layer. Polishing is stopped using the second insulating layer as a marker, thereby permitting precise control of the amount of polishing.

6 Claims, 19 Drawing Sheets

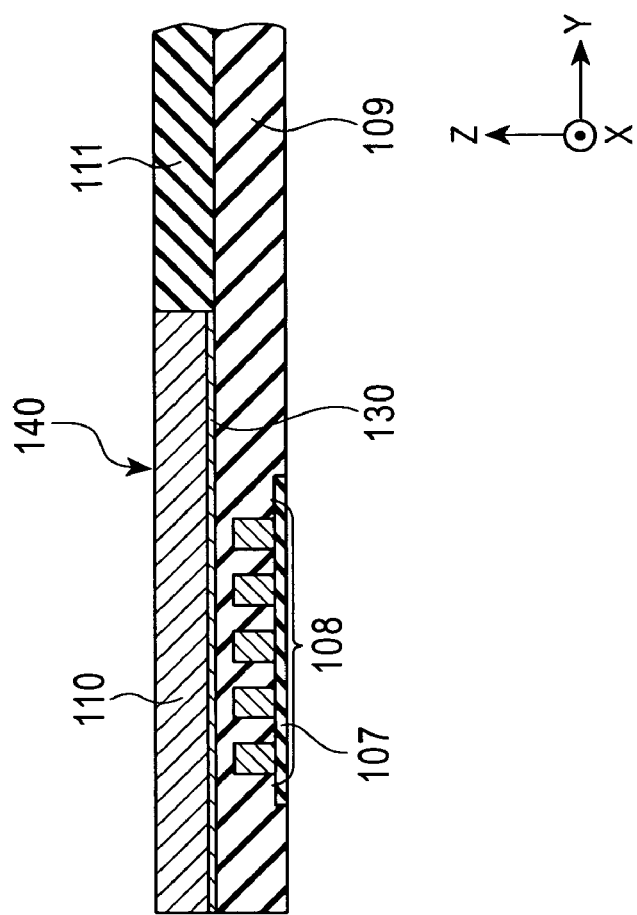
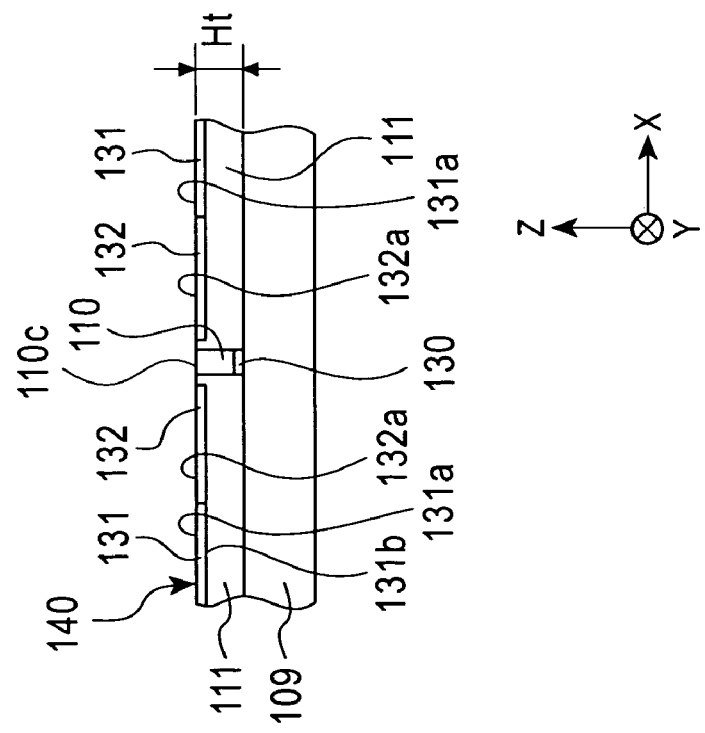
FIG. 9A
FIG. 9B

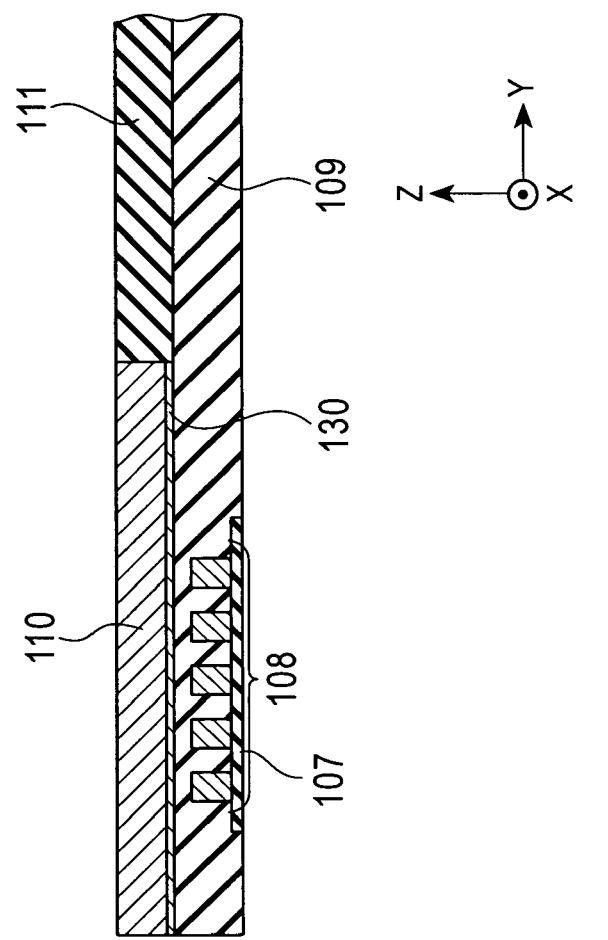
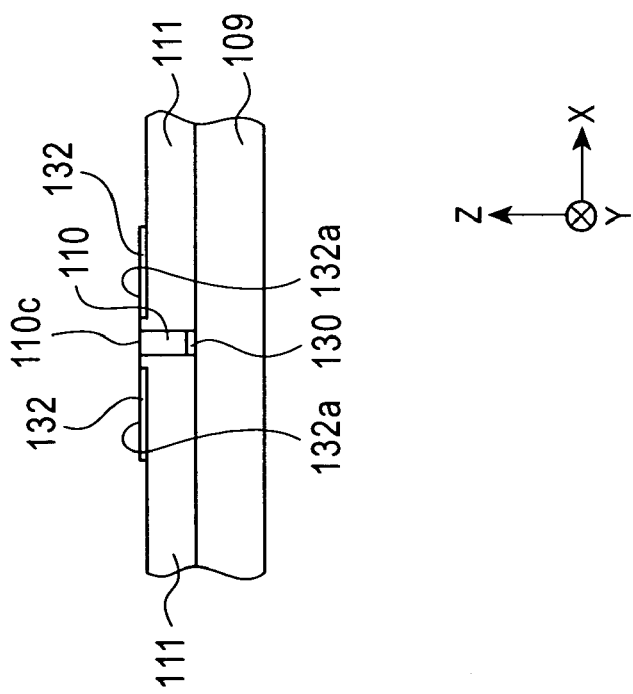

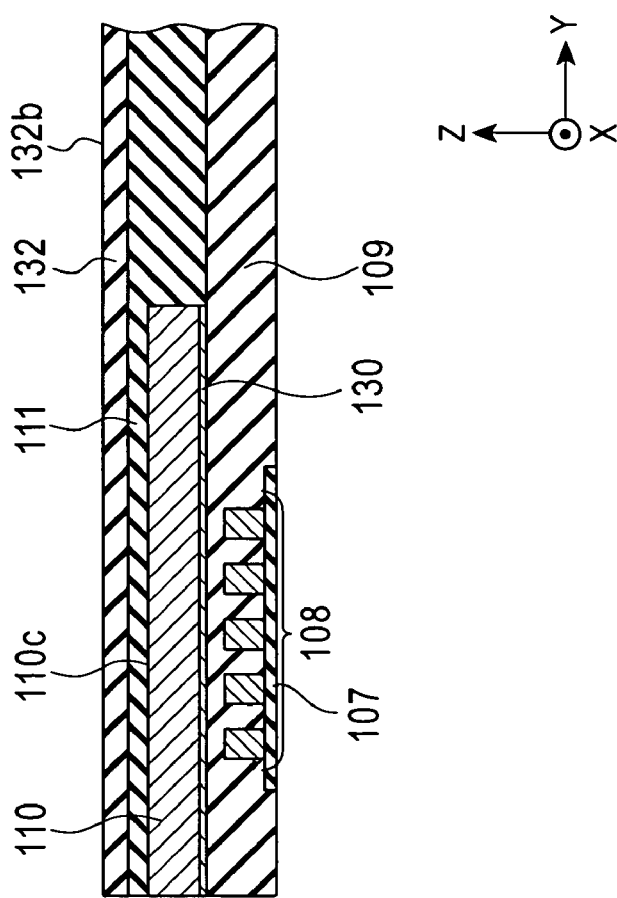
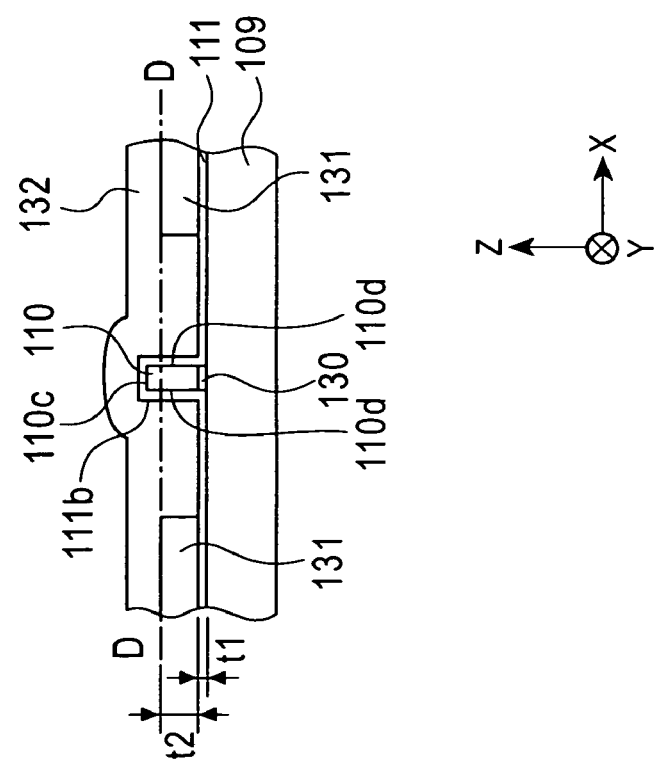
FIG. 16A
FIG. 16B

METHOD FOR MANUFACTURING MAGNETIC HEAD

This application claims the benefit of priority to Japanese Patent Application No. 2003-390098 filed on Nov. 20, 2003, herein incorporated by reference.

BACKGROUND OF THE INVENTION

1. Field of the Invention

The present invention relates to a method for manufacturing a magnetic head for recording on a recording medium comprising a hard film, such as a disk, by applying a magnetic field thereto. Particularly, the present invention relates to a method for manufacturing a magnetic head capable of precisely forming component members.

2. Description of the Related Art

Japanese Unexamined Patent Application Publication No. 11-232609 discloses a process for manufacturing a magnetic head. FIG. 2 of this document shows a step for manufacturing the magnetic head in which an alumina film for forming a gap is formed on a substrate to protrude therefrom, and then a permalloy film is formed over the alumina film (FIG. 2A), and a $SiO_2$ film is further formed on the permalloy film (FIG. 2B).

FIG. 18 shows the state shown in FIG. 2B of Japanese Unexamined Patent Application Publication No. 11-232609. As shown in FIG. 18, an alumina film 2 is formed on a substrate 1 to protrude therefrom, and a permalloy film 3 formed over the alumina film 2 rises in the vicinity of the top of the alumina film 2 to form a protruding portion 3a. The permalloy film 3 also has a flat portion 3b formed around the protruding portion 3b.

Therefore, a $SiO_4$ film 4 formed on the permalloy film 3 also has a flat portion 4b formed on the flat portion 3b of the permalloy film 3, and a protruding portion 4a formed on the protruding portion 3a so as to protrude above the upper surface 4b1 of the flat portion 4b, depending upon the shape of the permalloy film 3.

According to the process disclosed in this document, in the state shown in FIG. 18 (FIG. 2B of this document), the upper surface of the $SiO_2$ film 4 is polished by CMP (Chemical Mechanical Polishing) to cut the protruding portions 4a and 3a. In this step, the $SiO_2$ film 4 has a stopper function to stop the polishing at the upper surface 4b1 of the flat portion 4b and to form the upper surfaces of the $SiO_2$ film 4, the permalloy film 3, and the alumina film 2 as the same planarized surface. FIG. 19 shows the state at the end of polishing, which is shown in FIG. 2C of the document.

Japanese Unexamined Patent Application Publication No. 7-272211 also discloses a process for manufacturing a magnetic head on the basis of the same idea as that of the invention disclosed in the above-described document. FIG. 1 of this document shows a step for manufacturing the magnetic head in which a magnetic core is formed on a substrate with a first insulating layer provided therebetween, a second insulating layer is formed to cover the sides and upper surface of the magnetic core, and a hard metal film functioning as a polishing stopper layer is formed on the second insulating layer (FIG. 1A).

FIG. 20 shows the state shown in FIG. 1A of this document. As shown in FIG. 20, a first insulating film 12 is formed on a substrate 11, and a magnetic core 13 is formed on the first insulating film 12 so as to protrude therefrom. Furthermore, a second insulating film 14 formed over the magnetic core 13 rises in the vicinity of the top of the magnetic core 13 to form a protruding portion 14a. The second insulating layer 14 also has a flat portion 14b around the protruding portion 14a. Therefore, the hard metal film 15 formed on the second insulating film 14 also has a flat portion 15b formed on the flat portion 14b of the second insulating film 14, and a protruding portion 15a formed on the protruding portion 14a so as to protrude above the upper surface 15b1 of the flat portion 15b, depending upon the shape of the second insulating film 14.

According to the process disclosed in the document, in the state shown in FIG. 20 (FIG. 1A of the document), the upper surface of the hard metal film 15 is polished using a polishing pad comprising an elastic material to cut the protruding portions 15a and 14a. In this step, the hard metal film 15 functions as a stopper to stop polishing at the upper surface 15b1 of the flat portion 15b, thereby forming the upper surfaces of the hard metal film 15 and the magnetic core 13 as the same planarized surface. The state at the end of polishing is shown in FIG. 1D of the document. FIG. 21 shows the state shown in FIG. 2C of the document.

However, in the invention disclosed in Japanese Unexamined Patent Application Publication No. 11-232609, when the protruding portions 4a and 3a are polished by CMP, a difference between the CMP rates or etching rates of the $SiO_2$ film 4 forming the protruding portion 4a and the permalloy film 3 forming the protruding portion 3a causes the following problem:

In the process for manufacturing the magnetic head disclosed in Japanese Unexamined Patent Application Publication No. 11-232609, as shown in FIG. 18, the $SiO_2$ film 4 has the protruding portion 4a protruding above the upper surface 4b1 of the flat portion 4b. Therefore, during the time from the start of polishing shown in FIG. 18 to the end of polishing shown in FIG. 19, there is a state in which both the protruding portion 3a and the protruding portion 4a formed thereon are simultaneously polished as shown by line D—D in FIG. 18.

In the state in which both the protruding portion 3a and the protruding portion 4a formed thereon are simultaneously polished, when the CMP rate or etching rate of the permalloy film 3 forming the protruding portion 3a is higher than that of the $SiO_2$ film 4 forming the protruding portion 4a, the permalloy film 3 is more rapidly polished than the $SiO_2$ film 4. Thus, when the $SiO_2$ film 4 is polished to the upper surface 4b1 of the flat portion 4b of the $SiO_2$ film 4, the permalloy film 3 is excessively polished to a position lower than the upper surface 4b1 of the flat portion 4b, thereby failing to form the planarized surface. When the planarized surface cannot be formed, the thickness of the alumina film 2, which functions as a read-write gap, cannot be controlled, and thus the magnetic head cannot be precisely manufactured.

Conversely, when the CMP rate or etching rate of the permalloy film 3 forming the protruding portion 3a is lower than that of the $SiO_2$ film 4 forming the protruding portion 4a, the permalloy film 3 is more slowly polished than the $SiO_2$ film 4. Thus, when the $SiO_2$ film 4 is polished to the upper surface 4b1 of the flat portion 4b of the $SiO_2$ film 4, the permalloy film 3 is polished to a position above the upper surface 4b1 of the flat portion 4b, thereby failing to form the planarized surface. Therefore, the magnetic head cannot be precisely manufactured.

On the other hand, even in the invention disclosed in Japanese Unexamined Patent Application Publication No. 7-272211, as shown in FIG. 20, the hard metal film 15 has the protruding portion 15a formed to protrude above the upper surface 15b1 of the flat portion 15b. There is thus a state in which both the protruding portion 14a and the protruding portion 15a formed thereon are simultaneously polished as shown by line D—D in FIG. 20. Therefore, when the CMP rate or etching rate of the second insulating film 14 is different from that of the hard metal film 15, the planarized surface cannot be formed at the end of polishing to the upper surface 15b1 of the flat portion 15b of the hard metal film 15, like in the invention disclosed in Japanese Unexamined Patent Application Publication No. 11-232609. Therefore, the magnetic head cannot be precisely manufactured.

SUMMARY OF THE INVENTION

Accordingly, it is an object of the present invention to solve the above problem and provide a method for precisely manufacturing a magnetic head capable of forming a planarized surface even by using materials having different CMP rates or etching rates, and also capable of easily determining the thickness dimension of a component member such as a magnetic pole layer within a predetermined range.

A method for manufacturing a magnetic head of the present invention comprises the following steps:

(a) the step of forming a magnetic pole layer using a magnetic material;

(b) the step of providing a first insulating layer on the sides and upper surface of the magnetic pole layer to form a protruding portion, which covers the magnetic pole layer, and a flat portion disposed around the protruding portion;

(c) the step of laminating a second insulating layer on the flat portion of the first insulating layer;

(d) the step of laminating a third insulating layer over the first and second insulating layers;

(e) the step of polishing the third insulating layer and the protruding portion of the first insulating layer to expose the upper surface of the magnetic pole layer so that the upper surface of the magnetic pole layer is coplanar with the upper surface of the second insulating layer; and (f) the step of forming a coil layer above or below the magnetic pole layer.

The method may further comprise the step (f) of forming a return-path layer comprising a magnetic material on the magnetic pole layer with a gap layer provided therebetween before step (a) or after step (e).

Alternatively, the method may further comprise the step (g) of removing the second insulating layer after step (e).

In this case, when the first, second, and third insulating layers are polished under the same conditions, the polishing rate of the second insulating layer is preferably lower than those of the first and second insulating layers.

Each of the first and third insulating layers comprises alumina ($Al_2O_3$), and the second insulating layer comprises at least one of $SiO_2$, Al—Si—O, Al—Si—O—N, SiN, W, Ti, Ta, TaN, WTi, Mo, CrN, BN, $B_4C$, and DLC (diamond like carbon).

Each of the first and third insulating layers may comprise one or both of $SiO_2$ and Al—Si—O, and the second insulating layer may comprise at least one of W, Ti, Ta, TaN, WTi, Mo, CrN, BN, $B_4C$, and DLC (diamond like carbon).

In the present invention, the second insulating layer is formed on the flat portion of the first insulating layer, not formed on the protruding portion thereof. Therefore, up to the step of forming a planarized surface by CMP, only the first and third insulating layers can be cut. The second insulating layer functioning as a stopper layer and having a lower etching rate than those of the first and third insulating layers are not cut by CMP.

Therefore, in the present invention, the upper surface of a main magnetic pole can be precisely and easily formed as a planarized surface, and the thickness dimension of the main magnetic pole can be precisely controlled.

Thus, the recording characteristics of the magnetic head, such as overwrite characteristics, can easily be uniformized. Since the thickness dimension of the main magnetic pole can be precisely controlled, and in the magnetic head, the recording track width on a recording medium can be maintained in a predetermined standard range even when a skew angle occurs.

BRIEF DESCRIPTION OF THE DRAWINGS

FIGS. 9A and 9B are drawings showing a step after the step shown in FIGS. 7A and 7B;

FIGS. 10A and 10B are drawings showing a step of a method for manufacturing the magnetic head shown in FIG. 4;

FIGS. 16A and 16B are drawings showing a step of a method for manufacturing the magnetic head shown in FIG. 15;

DESCRIPTION OF THE PREFERRED EMBODIMENTS

Figure 1:
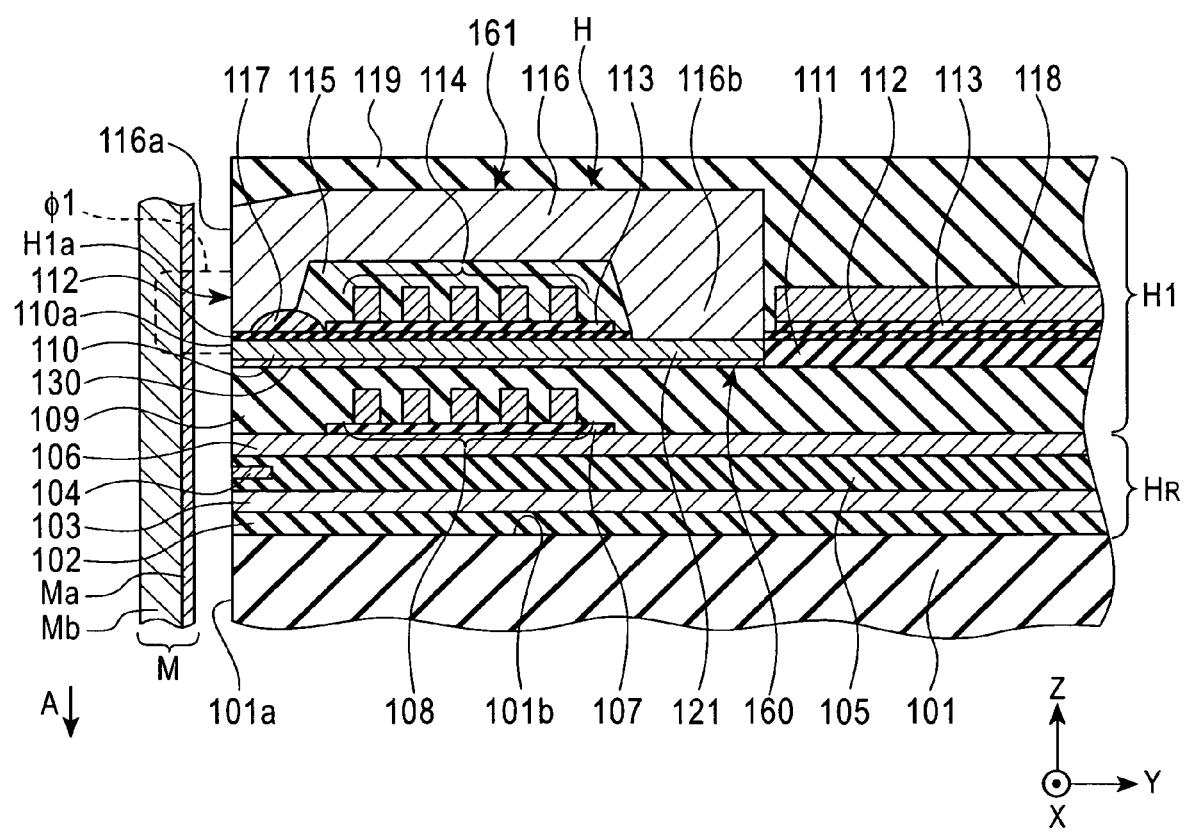
FIG. 1 is a longitudinal sectional view showing a magnetic head according to a first embodiment of the present invention.

FIG. 1 is a longitudinal sectional view showing a magnetic head according to a first embodiment of the present invention.

The magnetic head H1 shown in FIG. 1 is called a "vertical recording magnetic head" in which a vertical magnetic field is applied to a recording medium M to vertically magnetize a hard film Ma of the recording medium M.

The recording medium M has, for example, a disk shape and comprises the hard film Ma disposed in its surface and having high residual magnetization, and a soft film Mb disposed inward of the hard film Ma and having high magnetic permeability. The recording medium M is rotated around the center of the disk serving as a rotational axis.

A slider 101 comprises a nonmagnetic material such as $Al_2O_3$.TiC. When the recording medium M facing the recording-medium-facing surface 101a of the slider 101 is rotated, the slider 101 floats above the surface of recording medium M or slides on the recording medium M due to a surface airflow. In FIG. 1, the recording medium M is moved in direction A relative to the slider 101.

Also, a nonmagnetic insulating layer 102 comprising an inorganic material such as $Al_2O_3$ or $SiO_2$ is formed on the trailing-side end 101b of the slider 101, and a reading unit HR is formed on the nonmagnetic insulating layer 102.

The reading unit HR comprises a lower shield layer 103, an upper shield layer 106, and a reading element 104 disposed in an inorganic insulating layer (gap insulating layer) 105 between the lower shield layer 103 and the upper shield layer 106. The reading element 104 is a magnetoresistive element such as AMR, GMR, TMR, or the like.

Furthermore, a plurality of first coil layers 108 made of a conductive material is formed on the upper shield layer 106 with a coil insulating underlayer 107 provided therebetween. The first coil layers 108 comprise, for example, at least one nonmagnetic metal material selected from Au, Ag, Pt, Cu, Cr, Al, Ti, NiP, Mo, Pd, and Rh. The first coil layers 108 may have a laminated structure in which at least two of these nonmagnetic metal materials are laminated.

Furthermore, a coil insulating layer 109 made of an inorganic insulating material such as $Al_2O_3$ or the like is formed around the first coil layers 108.

The upper surface 109a of the coil insulating layer 109 is formed as a planarized surface, and a plating base layer 130 is formed on the upper surface 109a, and a main magnetic pole 110 is formed on the plating base layer 130 to extend for a predetermined length L2 from the recording-medium-facing surface H1a in the height direction. The main magnetic pole 110 has a width dimension corresponding to the track width Tw in the track width direction (X direction shown in the drawings). The main magnetic pole 101 is used as a magnetic pole layer in the present invention, and is formed by, for example, plating a ferromagnetic material. The main magnetic pole 101 comprises a material with a high saturation magnetic flux density, such as Ni—Fe, Co—Fe, Ni—Fe—Co, or the like.

Furthermore, a yoke portion 121 is formed integrally with the main magnetic pole 110 so as to extend from the base end 110b of the main magnetic pole 110 in the height direction (Y direction shown in the drawings), the yoke portion 121 having a width dimension W1 larger than the track width Tw in the track width direction. The main magnetic pole 110 and the yoke portion 121 constitute a first magnetic portion 160 (refer to FIG. 3). However, the main magnetic pole 110 and the yoke portion 121 may be formed separately. In the magnetic head H1 shown in FIG. 1, the first magnetic portion 160 comprising the main magnetic pole 110 and the yoke portion 121 is disposed on the reading side.

Specifically, the track width Tw is in the range of 0.05 µm to 1.0 µm, and the length L2 is in the range of 0.05 µm to 1.0 µm.

In the yoke portion 121, the maximum width dimension W1 in the track width direction (X direction shown in the drawings) is about 1 µm to 100 µm, and the length dimension L3 in the height direction is about 1 µm to 100 µm.

Figure 2:
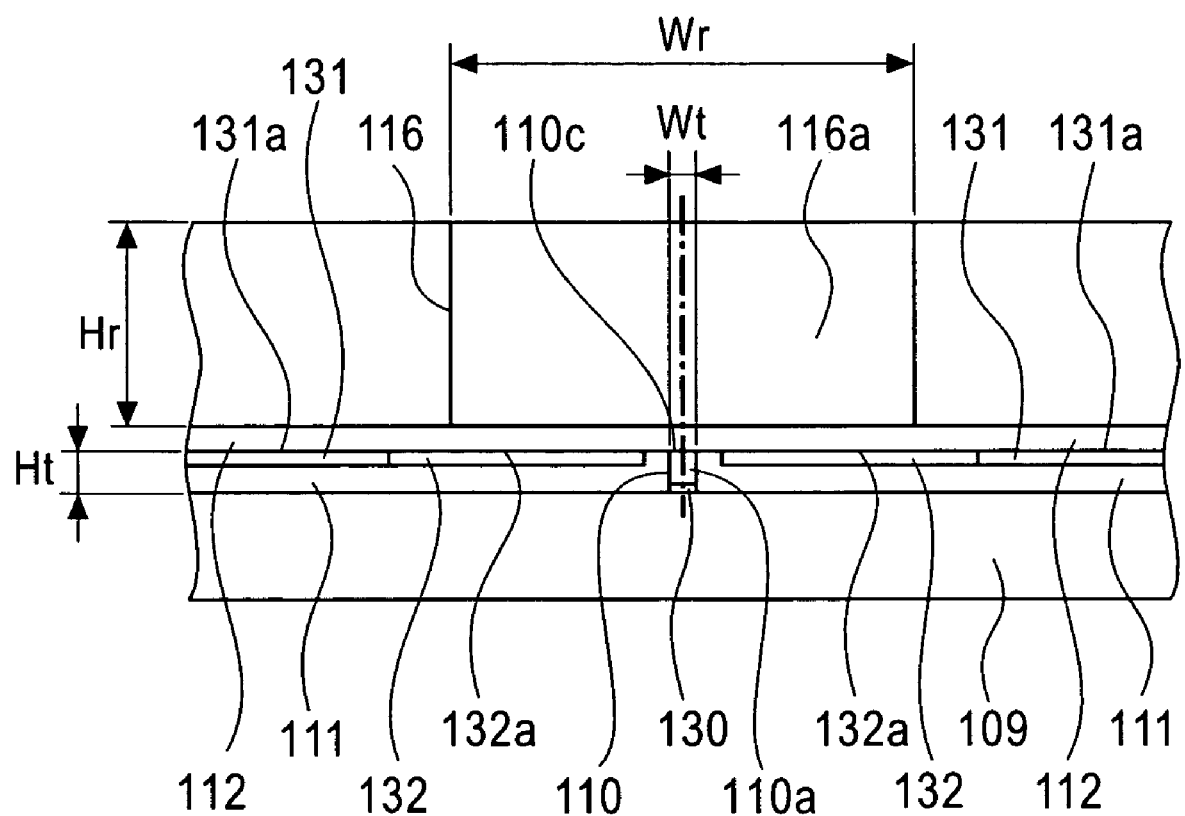
FIG. 2 is a partial front view of the magnetic head shown in FIG. 1.

FIG. 2 is a front view of the magnetic head H1 shown in FIG. 1. FIG. 1 is a sectional view of the magnetic head from an arrow direction, taken along a one-dot chain line in FIG. 2.

As shown in FIG. 2, the main magnetic pole 110 exposed at the recording-medium-facing surface H1a has a width dimension Wt in the track width direction (X direction shown in the drawing). Although not shown in the drawing, the width dimension of the yoke portion 121 is larger than the width dimension Wt of the main magnetic pole 110 in the track width direction (refer to FIG. 3).

As shown in FIGS. 1 and 2, a first insulating layer 111 is provided around the main magnetic pole 110, and second and third insulating layers 131 and 132 are formed on the first insulating layer 111. The upper surface 110c of the main magnetic pole 110 is coplanar with the upper surfaces 131a and 132a of the second and third insulating layers 131 and 132 disposed on both sides of the main magnetic pole 110.

The first and third insulating layers 111 and 132 can be formed using, for example, alumina ($Al_2O_3$), $SiO_2$, or Al—Si—O.

When the first and third insulating layers 111 and 132 are formed using, for example, alumina ($Al_2O_3$), the second insulating layer 131 is preferably formed using at least one material selected from $SiO_2$, Al—Si—O, Al—Si—O—N, SiN, W, Ti, Ta, TaN, WTi, Mo, CrN, BN, $B_4C$, and DLC (diamond like carbon).

When the first and third insulating layers 111 and 132 are formed using one or both of $SiO_2$ and Al—Si—O, the second insulating layer 131 is preferably formed using at least one material selected from W, Ti, Ta, TaN, WTi, Mo, CrN, BN, $B_4C$, and DLC (diamond like carbon).

Each of the first, second, and third insulating layers 111, 131, and 132 has a structural characteristic derived from the manufacturing method of the present invention. This point will be described in detail below.

A gap layer 112 comprising an inorganic material such as alumina or $SiO_2$ is formed over the main magnetic pole 110, the yoke portion 121, and the first, second and third insulating layers 111, 131, and 132.

As shown in FIG. 1, a plurality of second coil layers 114 is formed on the gap layer 112 with a coil insulating underlayer 113 provided therebetween. Like the first coil layers 108, the second coil layers 114 are formed using a conductive material. The second coil layers 114 may comprise at least one nonmagnetic metal material selected from Au, Ag, Pt, Cu, Cr, Al, Ti, NiP, Mo, Pd, and Rh, or a lamination of at least two of these nonmagnetic metal materials.

Figure 3:
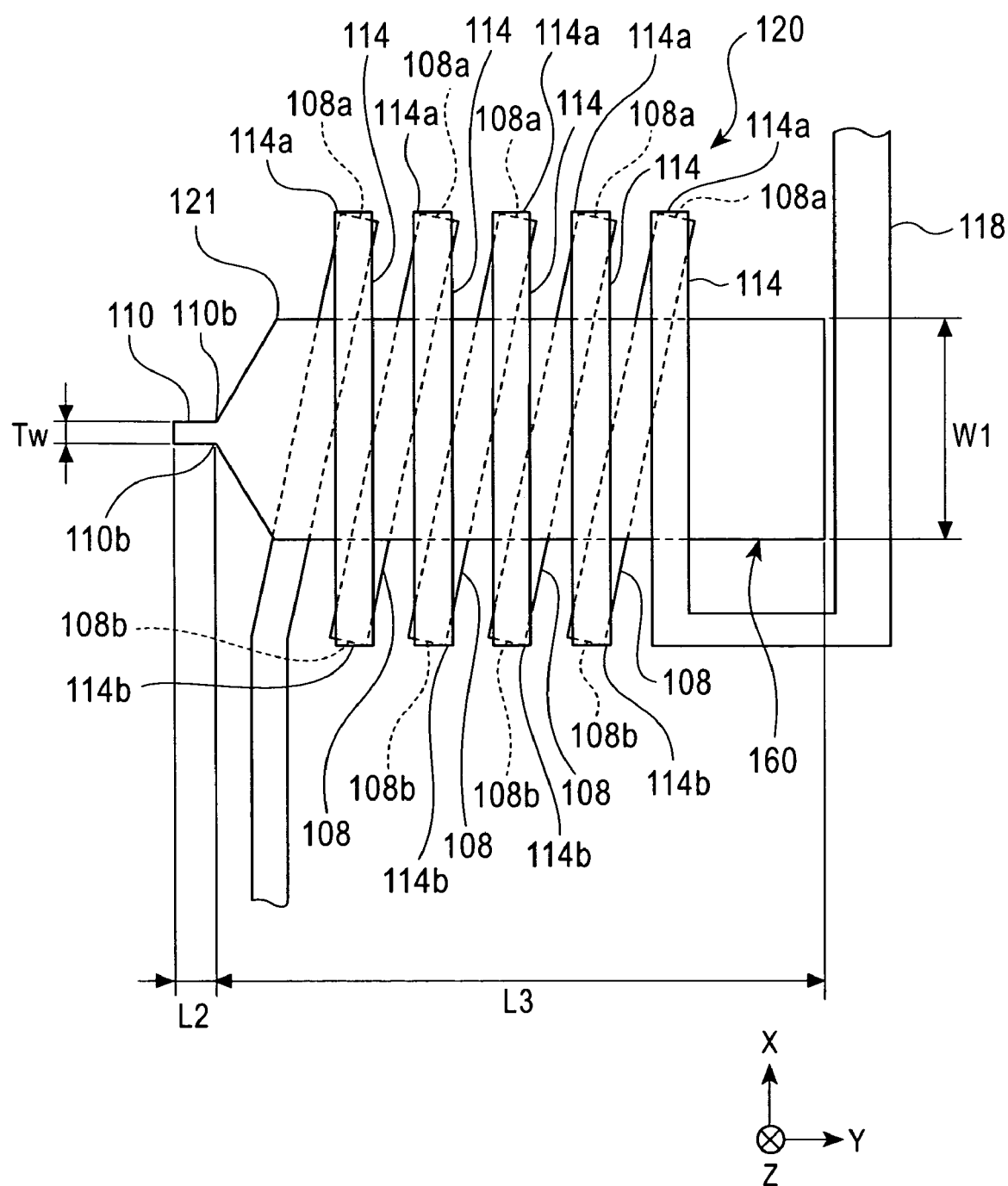
FIG. 3 is a partial plan view of the magnetic head shown in FIG. 1.

As shown in FIG. 3, the first coil layers 108 and the second coil layers 114 are electrically connected together at the ends 108a and 114a and at the ends 108b and 114b to form a toroidal coil layer 120 wound around the main magnetic pole 110 and the yoke portion 121 serving as an axis.

A coil insulating layer 115 made of an inorganic insulating material such as $Al_2O_3$ is formed around the second coil layers 114, and a return-path layer 116 serving as a second magnetic portion 161 in the present invention is formed over the coil insulating layer 115 and the gap layer 112 using a ferromagnetic material such as permalloy or the like.

As shown in FIG. 2, the thickness dimension Ht of the front end 110a of the main magnetic pole 110 is smaller than the thickness Hr of the front end 116a of the return-path layer 116, and the width dimension Wt of the front end 110a of the main magnetic pole 110 in the track width direction (X direction shown in the drawing) is sufficiently smaller than the width dimension Wr of the front end 116a of the return-path layer 116. As a result, at the recording-medium-facing surface H1a, the area of the front end 110a of the main magnetic pole 110 is sufficiently smaller than that of the front end 116a of the return-path layer 116. Therefore, a magnetic flux φ of a leakage recording magnetic field is concentrated in the front end 110a of the main magnetic pole 110 to magnetize the hard film Ma in the vertical direction by the concentrated magnetic flux φ. As a result, magnetic data is recorded on the recording medium M.

The front end 116a of the return-path layer 116 is exposed at the recording-medium-facing surface H1a. Also, in the rear of the recording-medium-facing surface H1a, the connecting portion 116b of the return-path layer 116 is connected to the main magnetic pole 110 to form a magnetic path running from the main magnetic pole 110 to the return-path layer 116.

Furthermore, a Gd-determining layer 117 comprising an inorganic or organic material is formed on the gap layer 112 and at a predetermined distance from the recording-medium-facing surface H1a. The gap depth of the magnetic head H1 is determined by the distance from the recording-medium-facing surface H1a to the front end of the Gd-determining layer 117.

A lead layer 118 extended from the second coil layers 114 is formed on a coil insulating underlayer 113 in the rear of the connecting portion 116b of the return-path layer 116 in the height direction (Y direction shown in the drawing). The return-path layer 116 and the lead layer 118 are covered with a protective layer 119 made of an inorganic nonmagnetic insulating material.

In the magnetic head H1, when a recording current is supplied to the first coil layers 108 and the second coil layers 114 through the lead layer 118, a recording magnetic field is induced in the main magnetic pole 110 and the return-path layer 116 due to a current magnetic field of the current flowing through the first coil layers 108 and the second coil layers 114. Also, at the recording-medium-facing surface H1a, the magnetic flux φ1 of the recording magnetic field is generated from the front end 110a of the main magnetic pole 110 and passed through the hard film Ma and then the soft film Mb of the recording medium M to record a recording signal on the recording medium M. Thereafter, the magnetic flux φ1 returns to the front end 116a of the return-path layer 116.

As shown in FIG. 2, in the magnetic head H1, the second insulating material 131 is formed on the first insulating layer 111. However, in the magnetic head H1, the second insulating layer 131 need not necessarily be formed on the first insulating layer 111, as shown in, for example, FIG. 4.

A method for manufacturing the magnetic head H1 shown in FIGS. 1 to 3 will be described below.

FIGS. 5 to 9 show respective steps of the method for manufacturing the magnetic head H1. In each of the drawings, a partial front view from the recording-medium-facing surface H1a is shown on the left, and a longitudinal sectional view is shown on the right.

Figure 5B:
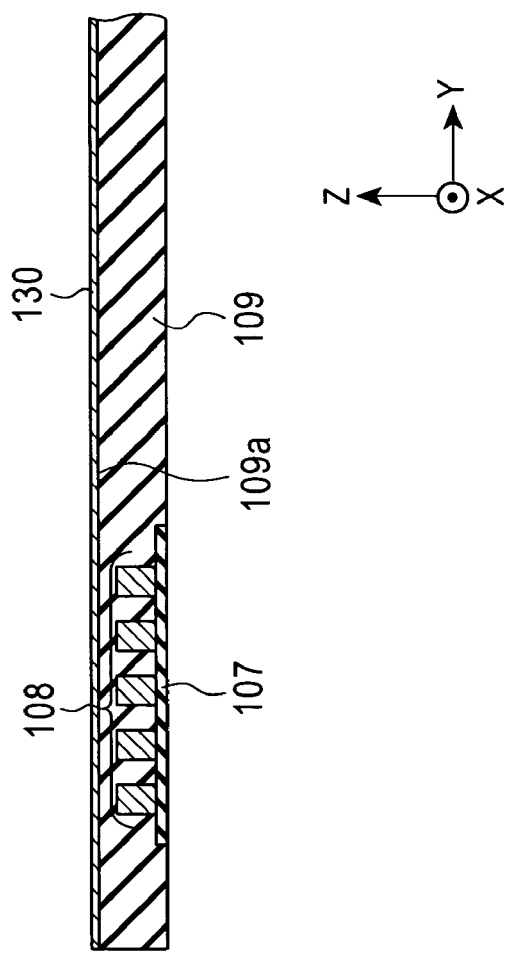
FIGS. 5A and 5B are drawings showing a step of a method for manufacturing the magnetic head shown in FIG. 1.
Figure 5A:
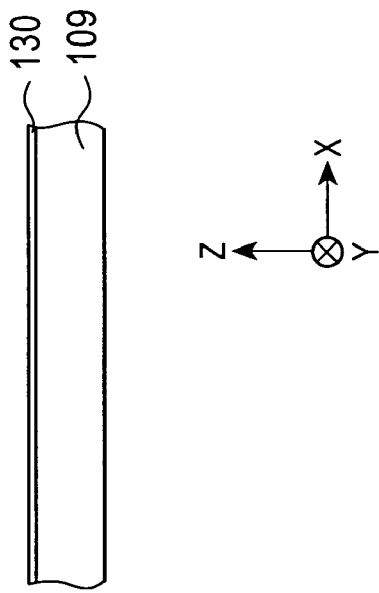

In the step shown in FIGS. 5A and 5B, the plurality of the first coil layers 108 made of a conductive material is formed on the reading unit HR through the coil insulating underlayer 107, and the coil insulating layer 109 made of an inorganic insulating material such as Al$_2$O$_3$ is formed around the first coil layers 108. Then, the upper surface 109a of the coil insulating layer 109 is polished by a known method such as CMP or the like to form the planarized surface at the upper surface 109a.

Next, the plating base layer 130 is deposited on the planarized upper surface 109a of the coil insulating layer 109 by sputtering. The plating base layer 130 can be formed using a magnetic material such as NiFe or a nonmagnetic material.

Figure 6B:
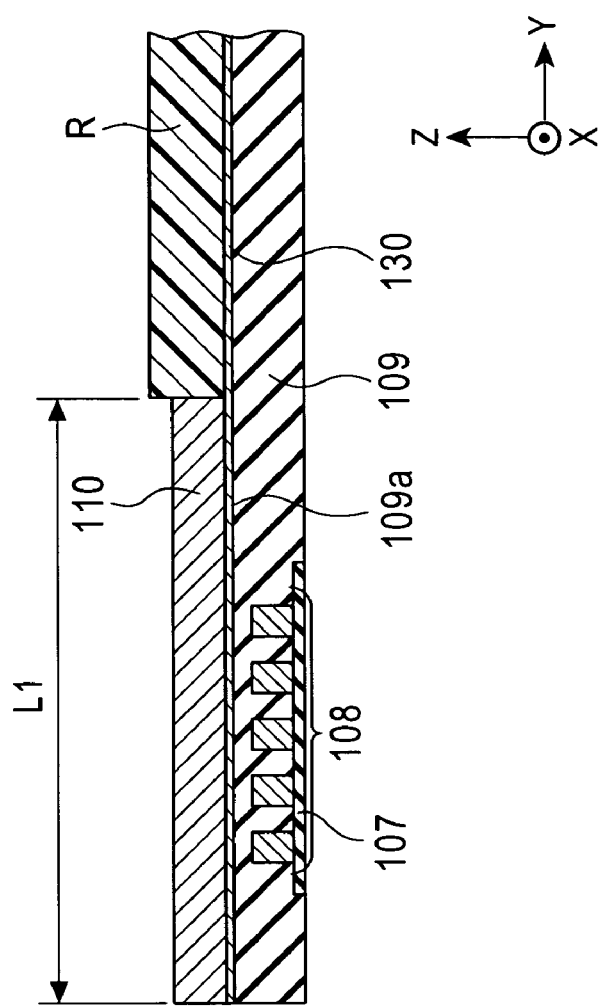
FIGS. 6A and 6B are drawings showing a step after the step shown in FIGS. 5A and 5B.
Figure 6A:
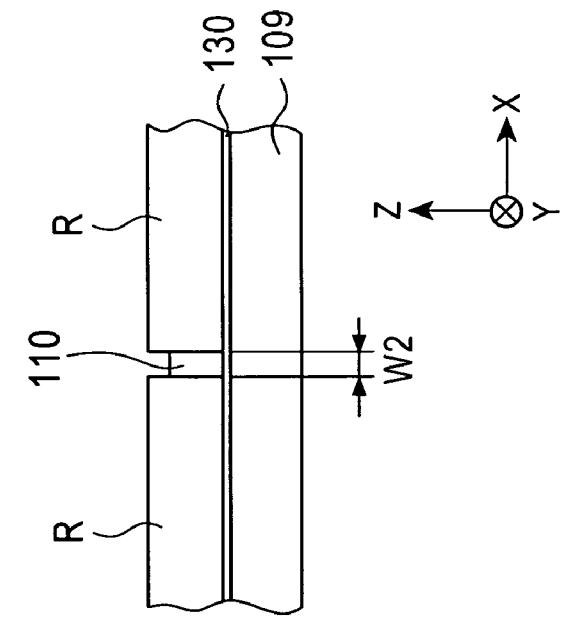

Next, as shown in FIGS. 6A and 6B, a resist layer R is formed on the plating base layer 130 and then subjected to pattern exposure and development to form a groove Ra. The groove Ra has a predetermined internal width dimension W2 in the track width direction (X direction shown in the drawing), and a predetermined length L1 from the recording-medium-facing surface H1a in the height direction (Y direction shown in the drawing).

Since, as shown in FIGS. 5A and 5B, the upper surface 109a of the coil insulating layer 109 is planarized by a method such as CMP, the resist layer R can be formed to a uniform thickness. Therefore, in forming the groove Ra by exposure and development, the internal width dimension of the groove Ra can be formed with high precision, i.e., without variation.

Then, the main magnetic pole 110 is formed by plating using the plating base electrode 130 as an electrode, and then, the resist layer R is removed.

In the step of forming the main magnetic pole 110 by plating as shown in FIGS. 6A and 6B, the thickness of the main magnetic pole 110 must be larger than that on completion. After the resist layer R is removed, the plating base layer 130 exposed around the main magnetic pole 110 is removed by ion milling. The main magnetic pole 110 may be cut by ion milling in the track width direction to decrease the dimension of the main magnetic pole 110 in the track width direction.

Figure 7B:
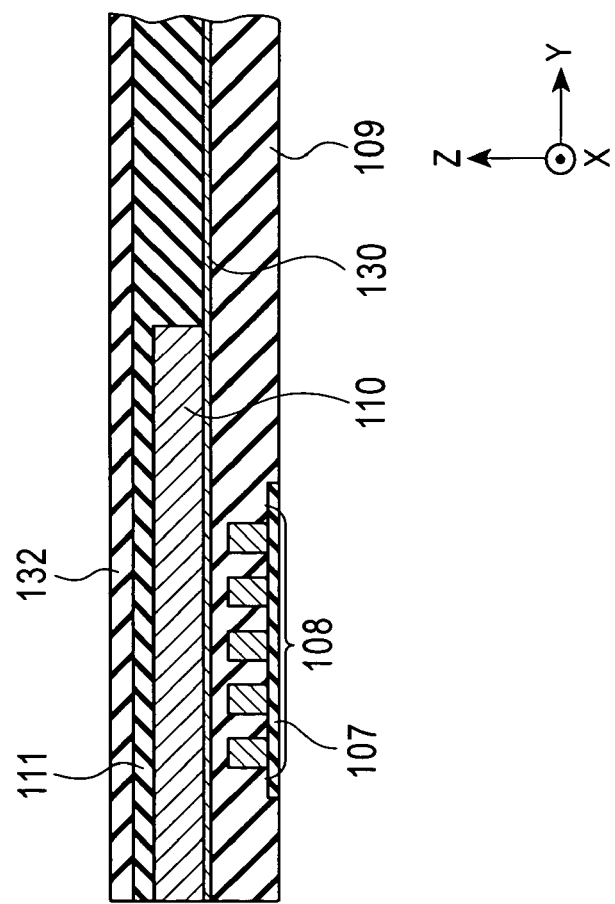
FIGS. 7A and 7B are drawings showing a step after the step shown in FIGS. 6A and 6B.
Figure 7A:
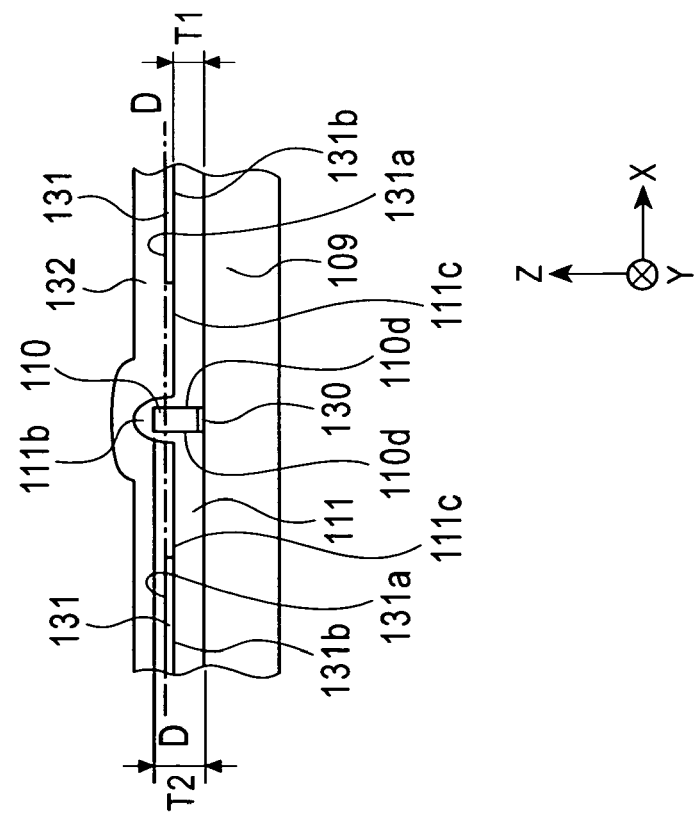

Next, in the step shown in FIGS. 7A and 7B, the first insulating layer 111 is provided on both sides, in the rear, and on the top of the main magnetic pole 110. The thickness T1 of the first insulating layer 111 disposed on both sides of the main magnetic pole 110 is smaller than the thickness T2 of the main magnetic pole 110.

The first insulating layer 111 has a protruding portion 111b protruding upward near the main magnetic pole 110, and a flat portion 111c disposed around the protruding portion 111b.

Furthermore, the second insulating layer 131 is laminated on the first insulating layer 111. As shown in FIGS. 7A and 7B, the second insulating layer 131 is formed on the flat portion 111c of the first insulating layer 111 and at a predetermined distance W3 from both sides 110d of the main magnetic pole 110, not formed on the protruding portion 111b of the first insulating layer 111.

Although the upper surface of the main magnetic pole 110 is polished in a subsequent step, the second insulating layer 131 is deposited so that the upper surface 110c of the main magnetic pole 110 is positioned between the upper surface 131a and the lower surface 131b of the second insulating layer 131 after the polishing step.

Figure 8:
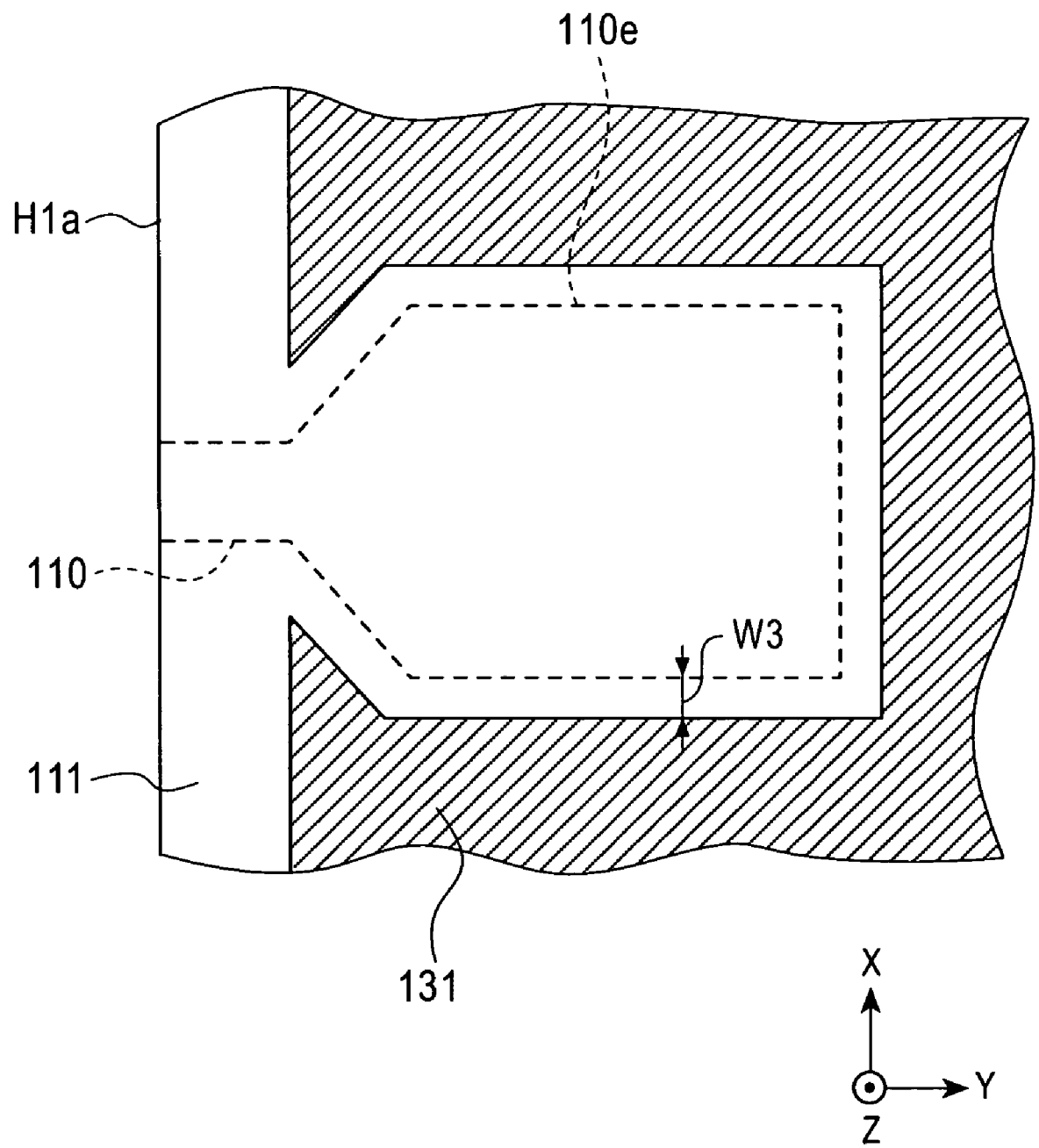
FIG. 8 is a partial plan view of the state shown in FIGS. 7A and 7B.

FIG. 8 is a plan view showing the magnetic pole layer 110, the first insulating layer 111, and the second insulating layer 131, as viewed from the top (Z direction shown in FIG. 7). In FIG. 8, the second insulating layer 131 is shown by hatched lines. As shown in FIG. 8, the second insulating layer 131 is formed on the flat portion 111c to surround the main magnetic pole 110, but the second insulating layer 131 is preferably not exposed at the recording-medium-facing surface H1a. When the second insulating layer 131 is formed to project from the recording-medium-facing surface H1a, the protruding portion of the second insulating layer 131 must be removed later, thereby complicating the manufacturing process. In the present invention, the second insulating layer 131 is not exposed at the recording-medium-facing surface H1a to decrease the number of the required manufacturing steps and facilitate the manufacture.

The second insulating layer 131 is formed at the predetermined distance W3 from the periphery 110e of the main magnetic pole 110. When the second insulating layer 131 is formed at the predetermined distance W3 from the periphery 110e of the main magnetic pole 110, the amount of the second insulating layer 131 formed can be decreased to decrease the manufacturing cost and speed up the manufacturing process.

Even when the second insulating layer 131 is formed at the predetermined distance W3 from the periphery 110e of the main magnetic pole 110, as described above, the second insulating layer 131 can be caused to function as a stopper in the CMP which will be described below. The distance W3 is preferably larger than the thickness of the main magnetic pole 110 after the CMP. When the distance W3 is formed as described above, the second insulating layer 131 can be securely formed on the flat portion 111c.

In the present invention, however, the second insulating layer 131 exposed at the recording-medium-facing surface H1a is not excluded.

Then, the third insulating layer 132 is formed on the second insulating layer 131. The third insulating layer 132 functions as an auxiliary polishing layer in the CMP described below.

Next, the third insulating layer 132 and the first insulating layer 111 which are disposed above the main magnetic pole 110 are cut to line D—D in FIG. 7 by CMP process to expose the upper surface 110c of the main magnetic pole 110 and form a planarized surface 140 including the upper surface 110c of the main magnetic pole 110, the upper surface 111a of the first insulating layer 111, the upper surface 131a of the second insulating layer 131, and the upper surface 132a of the third insulating layer 132. FIG. 9 shows the state at the completion of CMP.

When the CMP process is performed using acid slurry at a processing pressure of 25 kgf, the ratio of the polishing rate of the first and third insulating layers 111 and 132 comprising alumina ($Al_2O_3$) to the polishing rate of the second insulating layer comprising $SiO_2$ is 20:1. When the CMP process is performed using alkaline slurry, the polishing rate of the first and third insulating layers 111 and 132 comprising alumina ($Al_2O_3$) is higher than that of the second insulating layer 131 comprising $SiO_2$.

In the present invention, the polishing process in the step shown in FIGS. 9A and 9B is finished by using the second insulating layer 131 as a marker, i.e., a stopper.

After the step shown in FIGS. 9A and 9B, the gap layer 112, the Gd-determining layer 117, the coil insulating underlayer 113, the second coil layers 114, the lead layer 118, the coil insulating layer 115, the return-path layer 116, and the protective layer 119 are formed to obtain the magnetic head H1 shown in FIGS. 1 to 3. The materials for the gap layer 112, the Gd-determining layer 117, the coil insulating underlayer 113, the second coil layers 114, the lead layer 118, the coil insulating layer 115, the return-path layer 116, and the protective layer 119 have been described above with reference to FIGS. 1 to 3, thus description thereof is omitted here.

In the present invention, as described above, the polishing step shown in FIGS. 9A and 9B is finished by using the second insulating layer 131 as the marker, i.e., the stopper. Since the first and second insulating layers 111 and 131 are deposited by a thin film technique such as a sputtering process, the deposition thicknesses of the first and second insulating layers 111 and 131 can be precisely controlled. Namely, the position of the second insulating layer 131 in the thickness direction can be precisely determined, and thus the amount of polishing can be precisely controlled by polishing to the position of the second insulating layer 131.

Since the upper surface 110c of the main magnetic pole 110 is coplanar with the upper surface 131a of the second insulating layer 131, the thickness dimension H1 of the main magnetic pole 110 can be precisely controlled.

In the present invention, the materials for the first, second, and third insulating layers 111, 131, and 132 are selected so that the polishing rate of the second insulating layer 131 is lower than that of the first and third insulating layers 111 and 132 under the same polishing conditions. Namely, the materials are selected so that the CMP rate or etching rate of the second insulating layer 131 is lower than that of the first and third insulating layers 111 and 132 under the same conditions.

For example, when the first and third insulating layers 111 and 132 formed using alumina ($Al_2O_3$) and the second insulating layer 131 formed using $SiO_2$ are polished under the same conditions, the polishing rate of the second insulating layer 131 is about ½₀ of that of the first and third insulating layers 111 and 132. Therefore, the polishing step shown in FIGS. 9A and 9B can easily and securely finished at the position of the second insulating layer 131.

When the materials used for the first and third insulating layers 111 and 132 have a higher polishing rate than that of the material used for the second insulating layer 131 under the same polishing conditions, the time required for polishing can be decreased.

For these reasons, when the first and third insulating layers 111 and 132 are made of, for example, alumina ($Al_2O_3$), the second insulating layer 131 is preferably made of, for example, at least one of $SiO_2$, Al—Si—O, Al—Si—O—N, SiN, W, Ti, Ta, TaN, WTi, Mo, CrN, BN, $B_4C$, and DLC (diamond like carbon).

When the first and third insulating layers 111 and 132 are formed using one or both of $SiO_2$ and Al—Si—O, the second insulating layer 131 is preferably formed using at least one material selected from W, Ti, Ta, TaN, WTi, Mo, CrN, BN, $B_4C$, and DLC (diamond like carbon).

In the present invention, as shown in FIGS. 7A and 7B, the second insulating layer 131 is formed on the flat portion 111c of the first insulating layer 111, not formed on the protruding portion 111b of the first insulating layer 111. Therefore, during the time from the CMP step shown in FIGS. 7A and 7B to the step of forming the planarized surface 140 as shown in FIGS. 10A and 10B, only the first and third insulating layers 111 and 132 can be cut. The second insulating layer 131 functioning as the stopper layer and having a lower etching rate than that of the first and second insulating layers 111 and 132 is not cut in the CMP.

If the first, second, and third insulating layers 111, 131, and 132 are simultaneously cut, the first and third insulating layers 111 and 131 having a higher CMP rate or etching rate are more rapidly cut than the second insulating layer 131 having a lower CMP rate or etching rate. Therefore, it is very difficult to form the same planarized surface using the first, second, and third insulating layers 111, 131, and 132.

However, in the present invention, the first and third insulating layers 111 and 132 and the second insulating layer 131 having a lower CMP rate or etching rate need not be simultaneously cut, and thus the planarized surface 140 can be precisely and easily formed, and the thickness dimension Ht of the main magnetic pole 110 can be precisely controlled.

Therefore, the method for manufacturing the magnetic head of the present invention is capable of precisely controlling the thickness dimension Ht of the main magnetic pole 110 and thus uniformizing the recording characteristics of the magnetic head, such as overwrite characteristics.

Since the thickness dimension Ht of the main magnetic pole 110 can be precisely controlled, it is possible to manufacture a magnetic head in which the recording track width on a recording medium can be maintained in a predetermined standard range even when a skew angle occurs.

Figure 4:
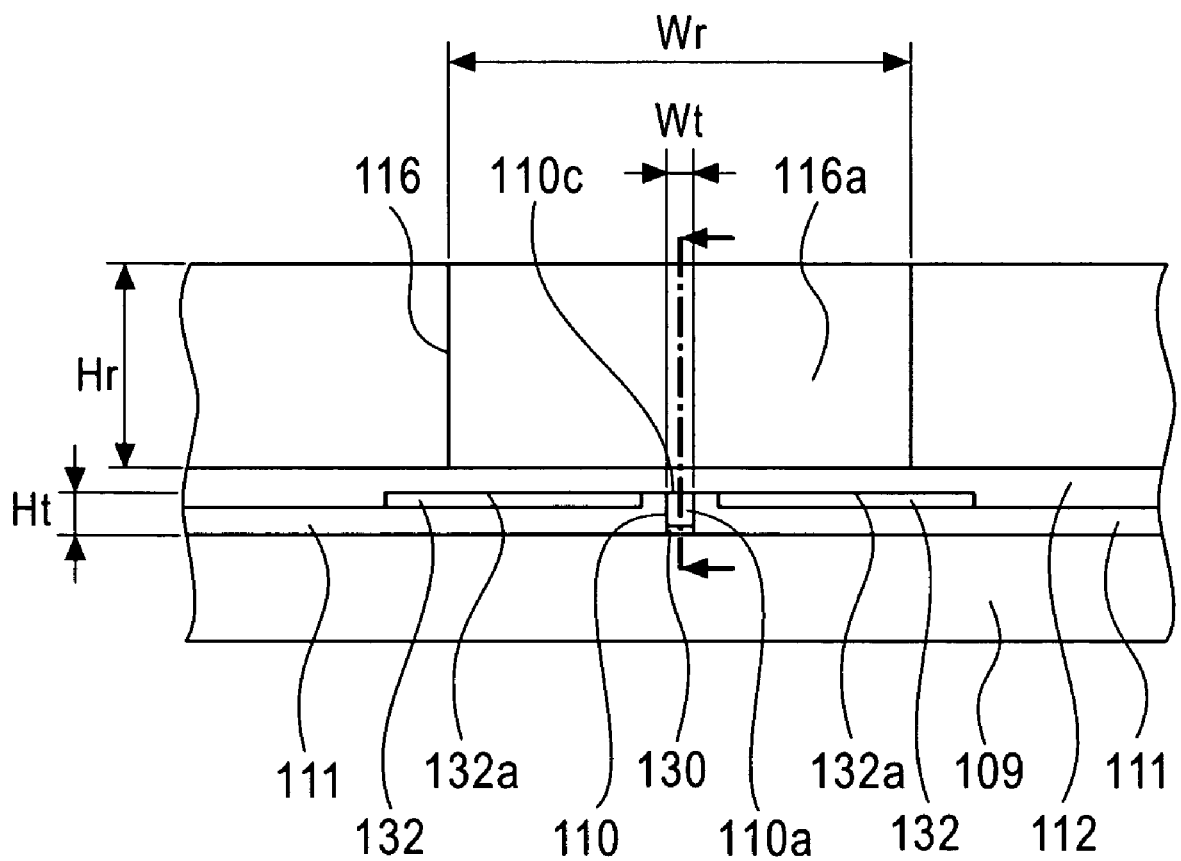
FIG. 4 is a partial front view showing a magnetic head of an example of the first embodiment of the present invention.

In order to manufacture a magnetic head H1' in which the second insulating layer 131 is not formed on the first insulating layer 111, as shown in FIG. 4, the second insulating layer 131 may be removed after the step shown in FIGS. 9A and 9B to create the state shown in FIGS. 10A and 10B, and then the gap layer 112, the Gd-determining layer 117, the coil insulating underlayer 113, the second coil layers 114, the lead layer 118, the coil insulating layer 115, the return-path layer 116, and the protective layer 119 may be formed.

Figure 11:
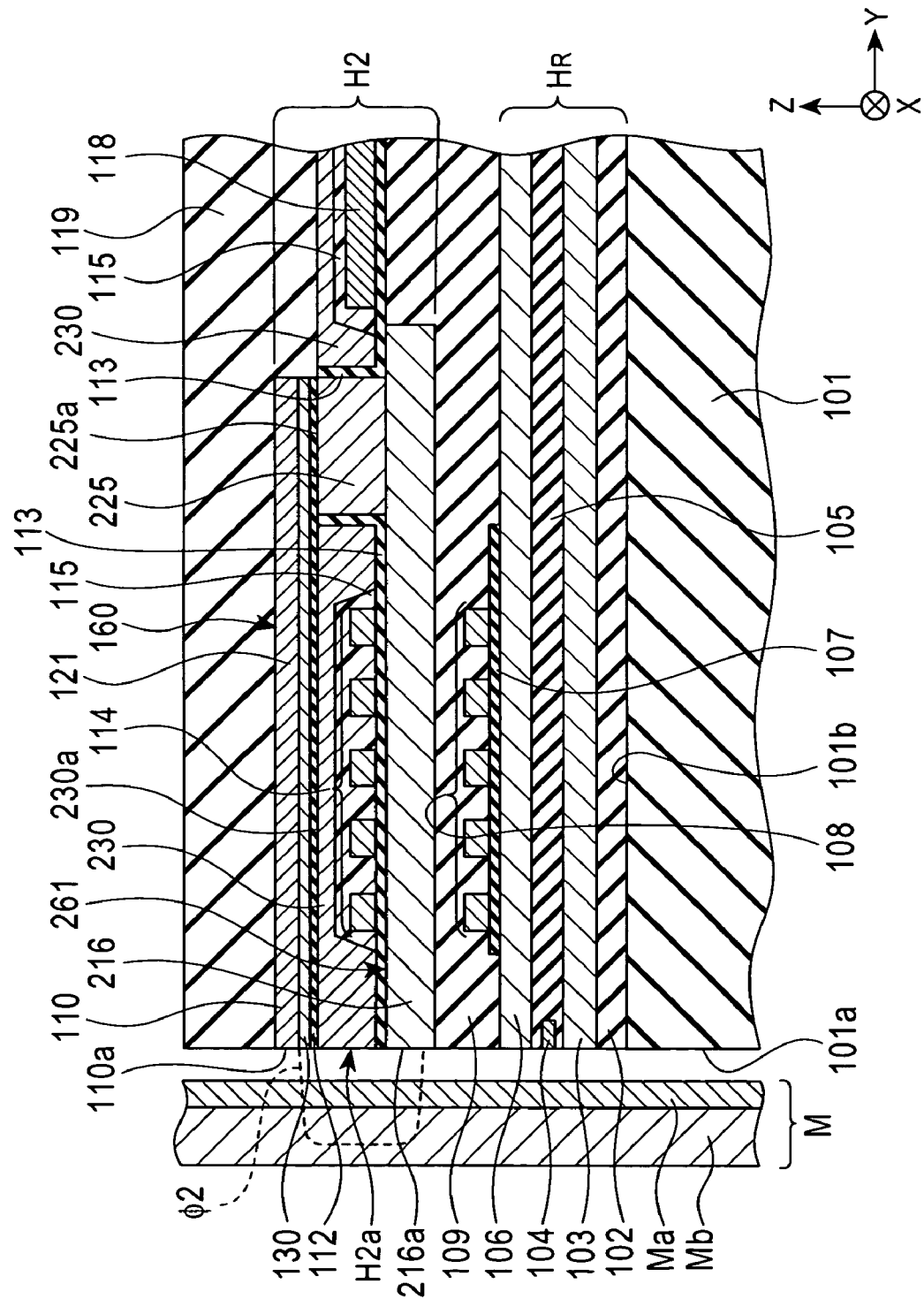
FIG. 11 is a longitudinal sectional view showing a magnetic head according to a second embodiment of the present invention.
Figure 12:
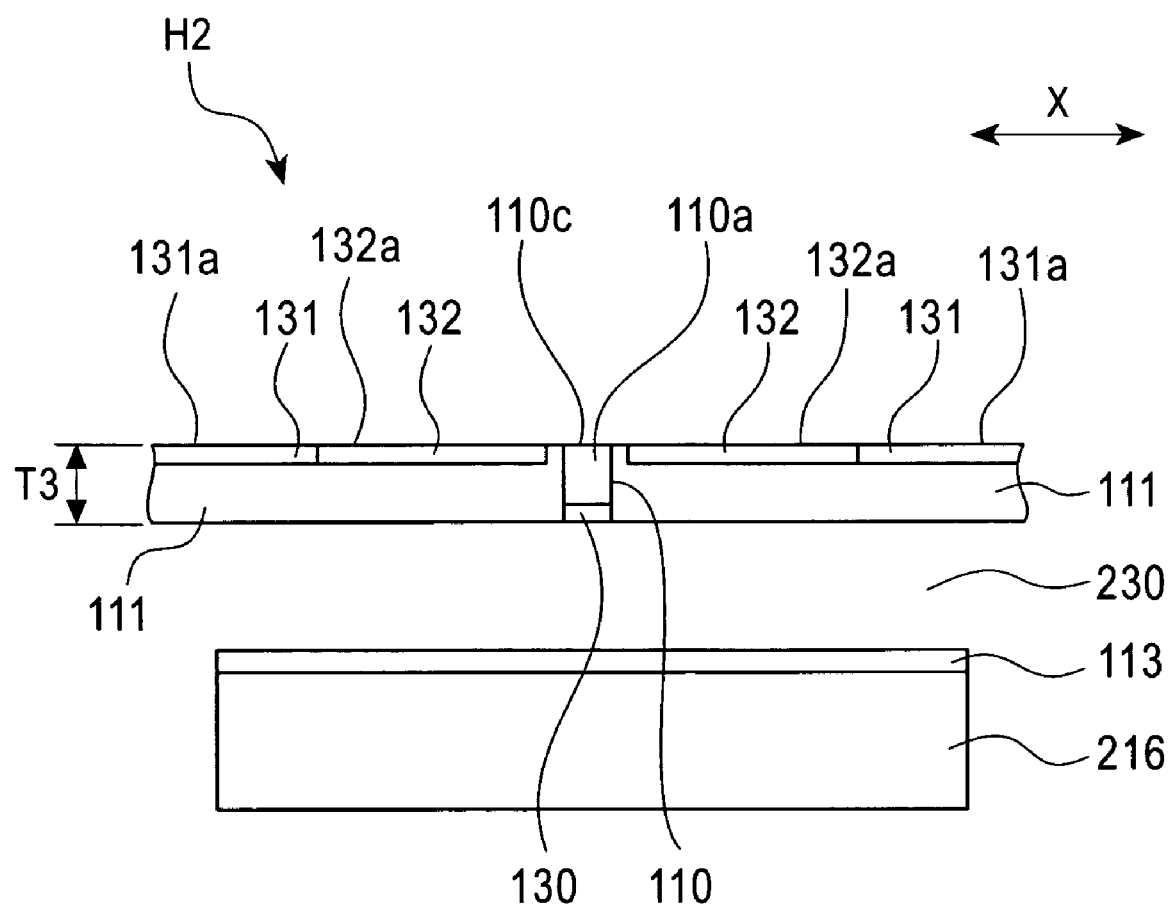
FIG. 12 is a partial front view of the magnetic head shown in FIG. 11.

FIG. 11 is a longitudinal sectional view showing a magnetic head according to a second embodiment of the present invention, and FIG. 12 is a front view of the magnetic head shown in FIG. 11, as viewed from the recording-medium-facing surface. The magnetic head H2 shown in FIGS. 11 and 12 is referred to as a "vertical recording magnetic head" in which a vertical magnetic field is applied to a recording medium M to vertically magnetize a hard film Ma of the recording medium M.

The magnetic head H2 shown in FIGS. 11 and 12 comprises the same components as in the magnetic head H1 shown in FIGS. 1 and 2. Therefore, in the magnetic head H2 shown in FIGS. 11 and 12, the same components as in the magnetic head H1 shown in FIGS. 1 and 2 are denoted by the same reference numerals, and the detailed description thereof is omitted.

As shown in FIG. 11, the reading unit HR is formed on the nonmagnetic insulating layer 102 formed at the trailing-side end 101b of the slider 101.

The recording magnetic head H2 is provided on the reading unit HR comprising the lower shield layer 103, the upper shield layer 106, and the reading element 104 disposed in the inorganic insulating layer (gap insulating layer) 105 between the lower and upper shield layers 103 and 106. The recording-medium-facing surface H2a of the magnetic head H2 is substantially coplanar with the recording-medium-facing surface 110a of the slider 101.

In the present invention, only the vertical recording magnetic head H2 may be mounted on the trailing-side end of the slider 101 without the reading unit HR.

Furthermore, the plurality of the first coil layers 108 made of a conductive material is formed on the upper shield layer 106 with the coil insulating underlayer 107 provided therebetween, and the coil insulating layer 109 is formed around the first coil layers 108.

A return-path layer 216 is formed on the upper surface 109a of the coil insulating layer 109 to extend from the recording-medium-facing surface H2a in the height direction. The return-path layer 216 is used as a second magnetic portion 261 in the present invention, and comprises a ferromagnetic material such as permalloy or the like. In the magnetic head H2 shown in FIG. 11, the second magnetic portion 261 comprising the return-path layer 216 is disposed on the reading unit side.

Furthermore, a connecting layer 225 comprising Ni—Fe is formed on the upper surface of the return-path layer 216 in a rear region in the height direction (Y direction shown in the drawing).

The coil insulating underlayer 113 is formed on the return-path layer 216, and the second coil layers 114 are formed on the coil insulating underlayer 113.

Figure 14:
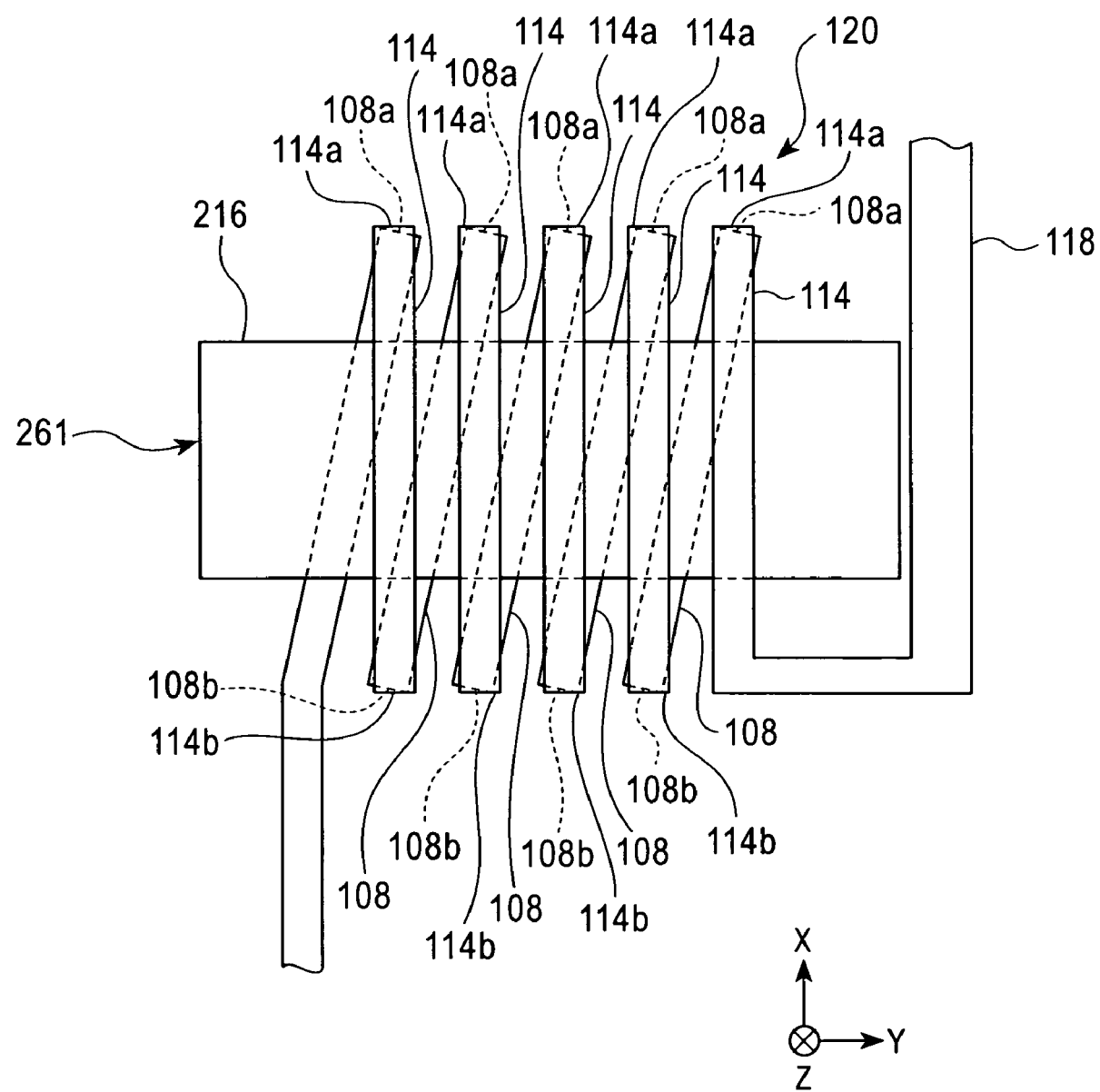
FIG. 14 is a partial plan view of the magnetic head shown in FIG. 11.

As shown in FIG. 14, the first coil layers 108 and the second coil layers 114 are electrically connected together at the ends 108a and 114a and at the ends 180b and 114b in the track width direction (X direction shown in the drawing) to form a toroidal coil layer 120 wound around the return-path layer 216 serving as an axis.

The coil insulating layer 115 is formed around the second oil layers 114, and is further covered with an insulating layer 230. The insulating layer 230 preferably comprises an inorganic insulating material. As the inorganic insulating material, at least one can be selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON. The upper surface 230a of the insulating layer 230 is planarized by a CMP technique or the like.

The gap layer 112, the plating base layer 130, the main magnetic pole 110, and the yoke portion 121 are formed on the upper surface 230a of the insulating layer 230. The first magnetic portion 160 comprises the main magnetic pole 110 and the yoke portion 121. However, the main magnetic pole 110 and the yoke portion 121 may be formed separately.

Figure 13:
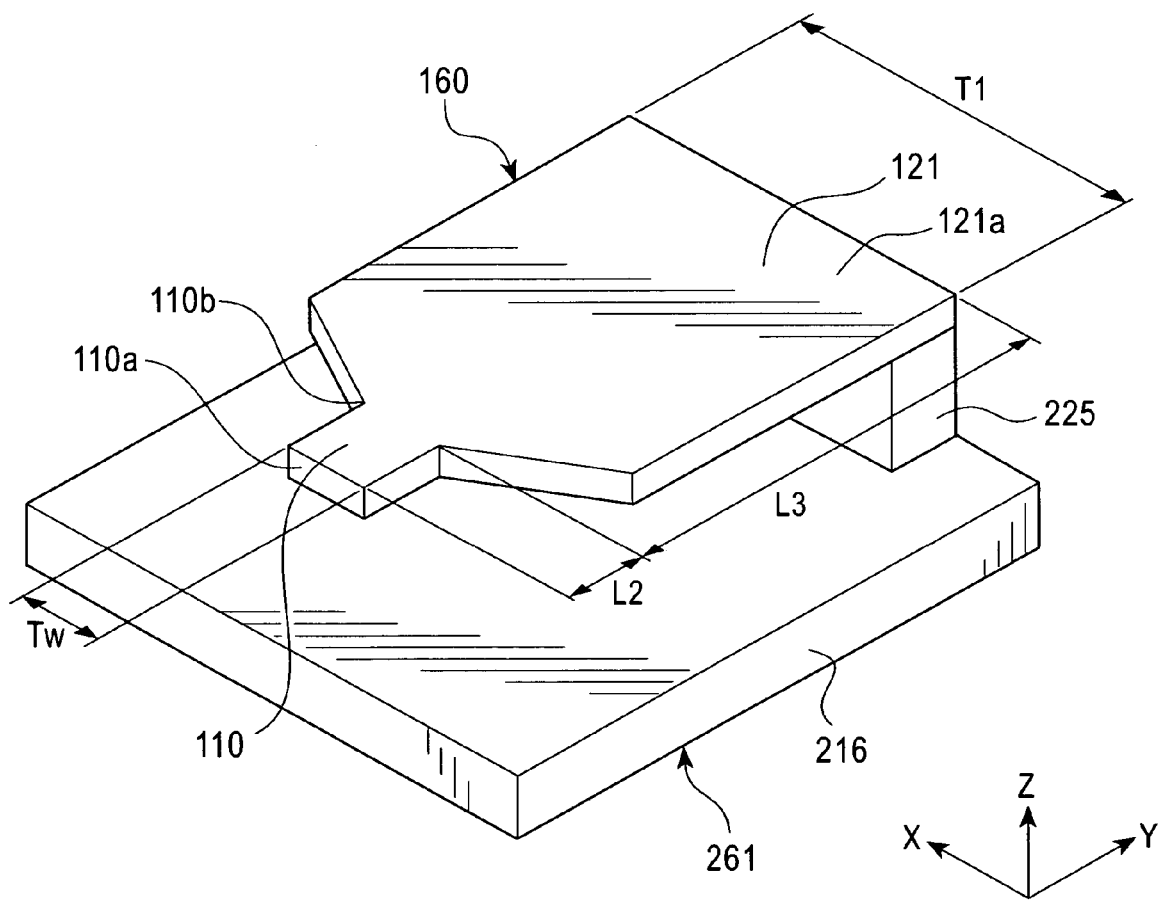
FIG. 13 is a partial perspective view of the magnetic head shown in FIG. 11.

FIG. 13 is a partial perspective view schematically showing the return-path layer 216, the connecting layer 225, and the main magnetic pole 110 of the magnetic head H2 shown in FIGS. 11 and 12. As shown in FIG. 11, the main magnetic pole 110 extends for a predetermined length from the front end 110a coplanar with the recording-medium-facing surface H2a in the height direction (Y direction shown in the drawing), and has a width dimension defined by a track width Tw in the track width direction (X direction shown in the drawing). Specifically, the track width Tw is in the range of 0.05 μm to 1.0 μm, and the length L2 is in the range of 0.05 μm to 1.0 μm.

As shown in FIG. 12, the first insulating layer 111 is provided around the main magnetic pole 110, and the second and third insulating layers 131 and 132 are formed on the first insulating layer 111. The upper surface 110c of the main magnetic pole 110 is coplanar with the upper surfaces 131a and 132a of the second and third insulating layers 131 and 132 disposed on both sides of the main magnetic pole 110. The first insulating layer 111 may be made of, for example, alumina ($Al_2O_3$), and the second insulating layer 131 may be made of at least one material selected from $SiO_2$, Al—Si—O, Al—Si—O—N, SiN, W, Ti, Ta, TaN, WTi, Mo, CrN, BN, $B_4C$, and DLC (diamond like carbon).

The third insulating layer 132 can be formed using the same material as that for the first insulating layer 111, for example, alumina ($Al_2O_3$).

As shown in FIG. 13, the yoke portion 121 is formed integrally with the main magnetic pole 110 to extend from the base end 110b of the main magnetic pole 110 in the height direction and to have a width dimension W1 larger than the track width Tw in the track width direction (X direction shown in the drawing). In the yoke portion 121, the maximum width dimension W1 in the track width direction (X direction shown in the drawing) is about 1 μm to 100 μm, and the length dimension L3 in the height direction is about 1 μm to 100 μm.

As shown in FIGS. 11 and 13, the base end 121*a* of the yoke portion 121 is formed on the connecting layer 225 so that the yoke portion 121 is magnetically connected to the upper surface 225*a* of the connecting layer 225. As a result, a magnetic circuit passing through the main magnetic pole 110, the yoke portion 121, the connecting layer 225, and the return-path layer 216 is formed.

The lead layer 118 extended from the second coil layers 114 is formed on the coil insulating underlayer 113 in the rear of the connecting layer 225 in the height direction (Y direction shown in the drawing). The coil insulating layer 115 and the insulating layer 230 are formed on the lead layer 118, and the main magnetic pole 110 and the insulating layer 230 are covered with the protective layer 119 made of an inorganic nonmagnetic insulating material.

In the magnetic head H2, when a recording current is supplied to the first coil layers 108 and the second coil layers 114 through the lead layer 118, a recording magnetic field is induced in the main magnetic pole 110 and the return-path layer 216 due to a current magnetic field of the current flowing through the first coil layers 108 and the second coil layers 114. Also, at the recording-medium-facing surface H2*a*, the magnetic flux φ2 of the recording magnetic field is generated from the front end 110*a* of the main magnetic pole 110 and passes through the hard film Ma and then the soft film Mb of the recording medium M to record a recording signal on the recording medium M. Thereafter, the magnetic flux φ2 returns to the front end 216*a* of the return-path layer 216.

In the magnetic head H2 shown in FIGS. 11 to 14, the main magnetic pole 110 can be formed by the same steps as those shown in FIGS. 5 to 9. Like in the step shown in FIGS. 7A and 7B, the first insulating layer 111 is deposited on the upper surface and both sides of the main magnetic pole 110 formed by plating, and then the second insulating layer 131 is formed on the flat portion 111*c* of the first insulating layer 111. Furthermore, the third insulating layer 132 is deposited on the first and second insulating layers 111 and 131. Then, as shown in FIGS. 9A and 9B, the planarized surface 140 is formed by the CMP step to expose the upper surface 110*c* of the main magnetic pole 110.

Figure 15:
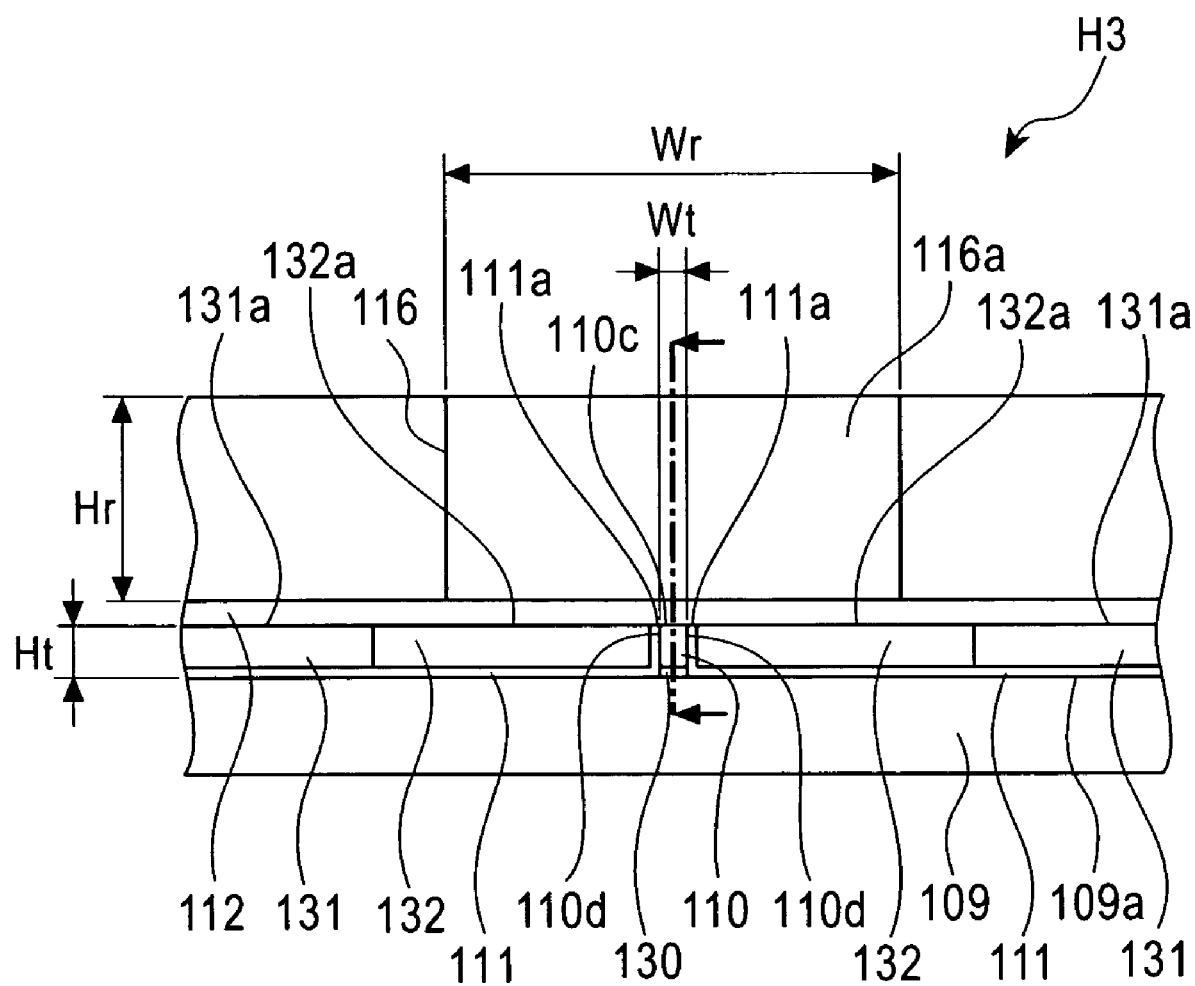
FIG. 15 is a longitudinal sectional view showing a magnetic head according to a third embodiment of the present invention.

FIG. 15 is a partial front view of a magnetic head H3 according to a third embodiment of the present invention, as viewed from the recording-medium-facing surface. In FIG. 15, the same components as in the magnetic head H1 shown in FIG. 2 are denoted by the same reference numerals, and the detailed description thereof is omitted.

In the magnetic head H3 shown in FIG. 15, the first insulating layer 111 is thinly formed on both sides 110*d* of the main magnetic pole 110 and on the upper surface 109*a* of the coil insulating layer 109. The thickness of the first insulating layer 111 is 0.05 μm to 0.1 μm. The second insulating layer 131 is provided around the main magnetic pole 110. The third insulating layer 132 is formed on the upper surface of the first insulating layer 111 and the sides of the second insulating layer 131 near the main magnetic pole 110. The upper surface 110*c* of the main magnetic layer 110, the upper surface 131*a* of the second insulating layer 131 disposed on both sides of the main magnetic pole 110, and the upper surface 111*a* of the first insulating layer 111 are coplanar with each other.

In order to form the main magnetic pole 110 of the magnetic head H3 shown in FIG. 15, as shown in FIGS. 16A and 16B, the first insulating layer 111 is formed over the upper surface 110*c* and the sides 10*d* of the main magnetic pole 110, and the upper surface 109*a* of the coil insulating layer 109 in the same step as that shown in FIGS. 7A and 7B for manufacturing the magnetic head H1 shown in FIGS. 1 to 3. The thickness t1 of the first insulating layer 111 is 0.05 μm to 0.1 μm. In this step, the first insulating layer 111 has the protruding portion 111*b* depending upon the shape of the main magnetic pole 110, and the flat portion 111*c* formed around the protruding portion 111*b*.

Next, the second insulating layer 131 is formed on the flat portion 111*c*. The second insulating layer 131 is first formed in the form of a solid film on the flat portion 111*c*, and then a portion around the main magnetic pole 110 is removed by a method such as reactive ion etching (RIE) to create the state shown in FIGS. 16A and 16B. In the RIE step, the main magnetic pole 110 can be prevented from being damaged or corroded because it is covered with the first insulating layer 111. Also, the main magnetic pole 110 can be prevented from being broken or falling down in the subsequent step of forming a resist around the main magnetic pole 110 and separating (removing) the resist.

In this step, the thickness t2 of the second insulating layer 131 is the same as that of the main magnetic pole 110 after the CMP process described below, and is, for example, 0.1 μm to 0.5 μm. Then, the third insulating layer 132 is deposited over the first insulating layer 111 and the second insulating layer 131.

Figure 17A:
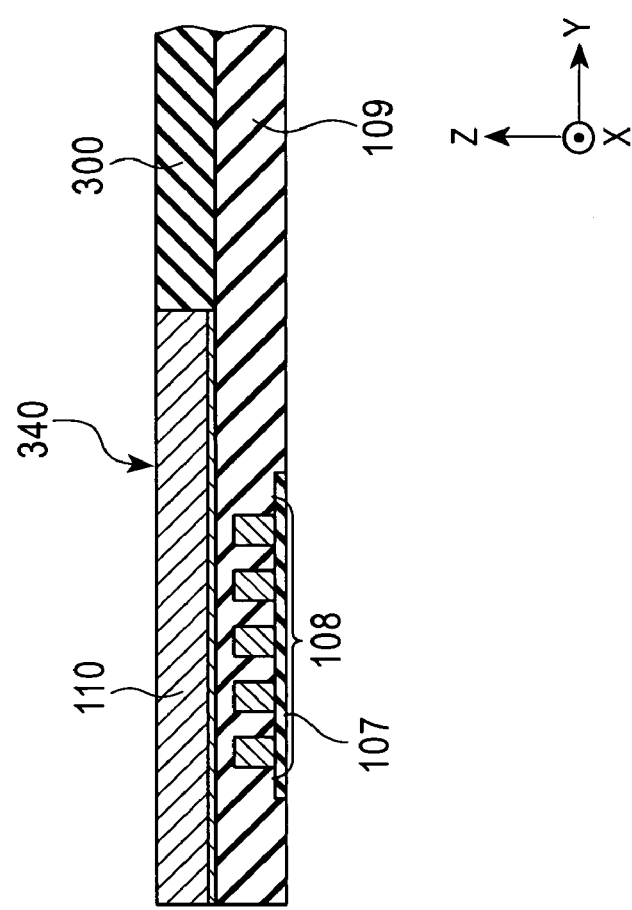
FIGS. 17A and 17B are drawings showing a step after the step shown in FIGS. 16A and 16B.
Figure 17B:
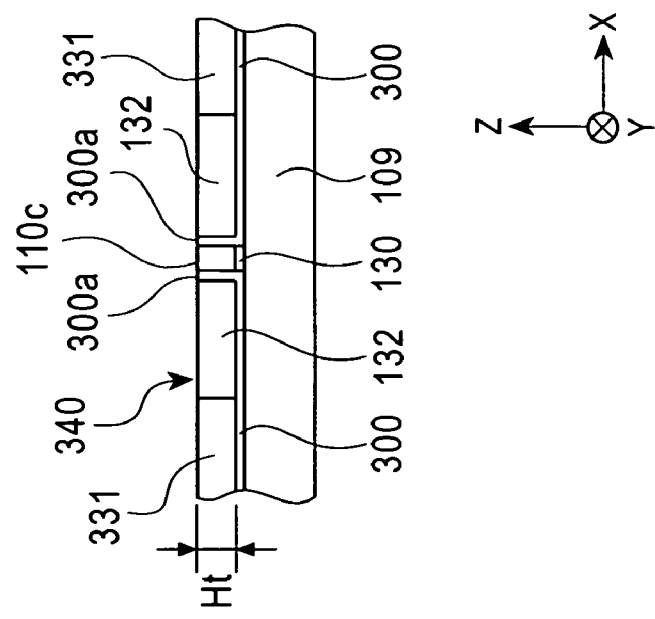
Figure 18:
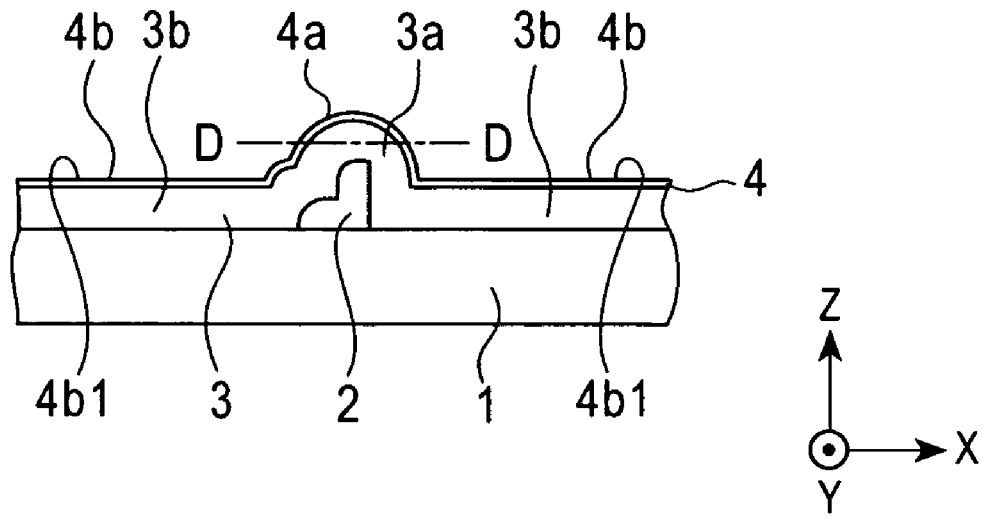
FIG. 18 is a drawing showing a step of a method for manufacturing a conventional magnetic head.
Figure 19:
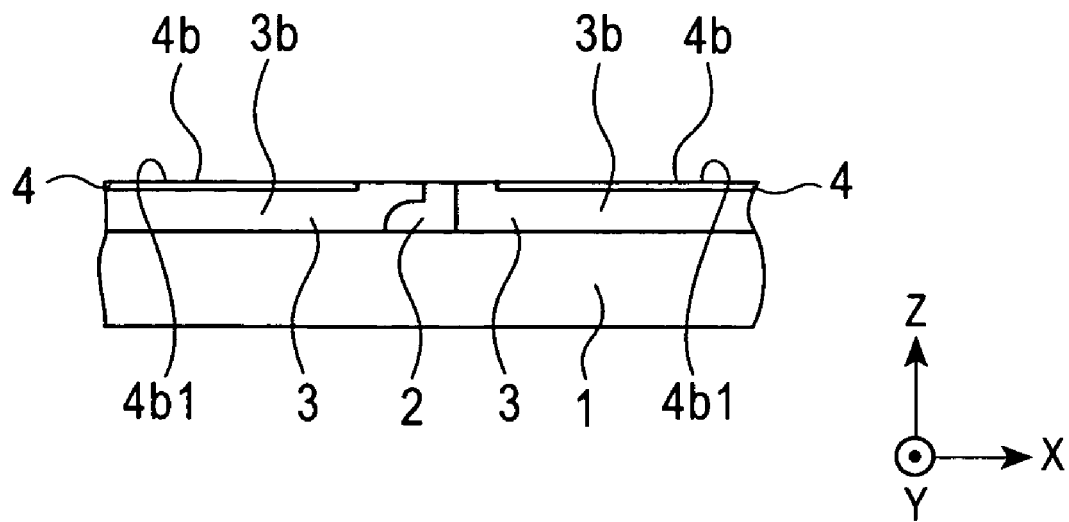
FIG. 19 is a drawing showing a step after the step shown in FIG. 18.
Figure 20:
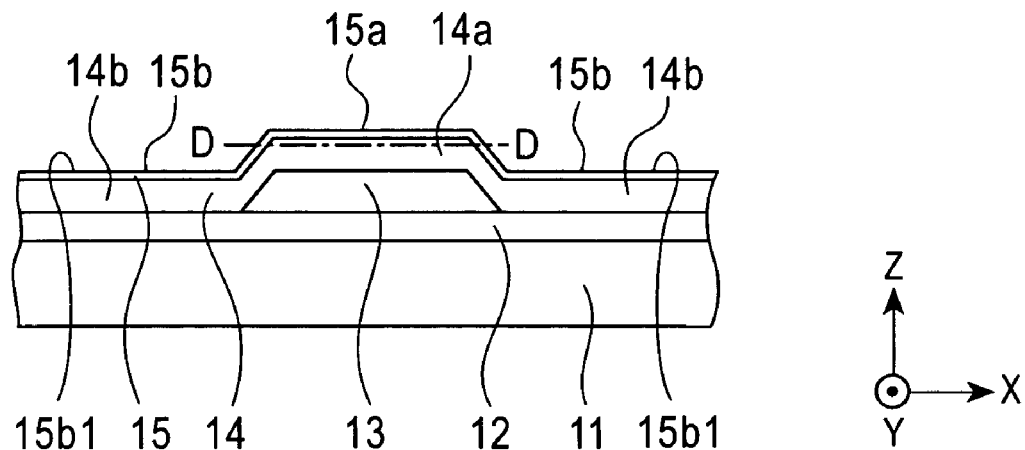
FIG. 20 is a drawing showing a step of a method for manufacturing another conventional magnetic head.
Figure 21:
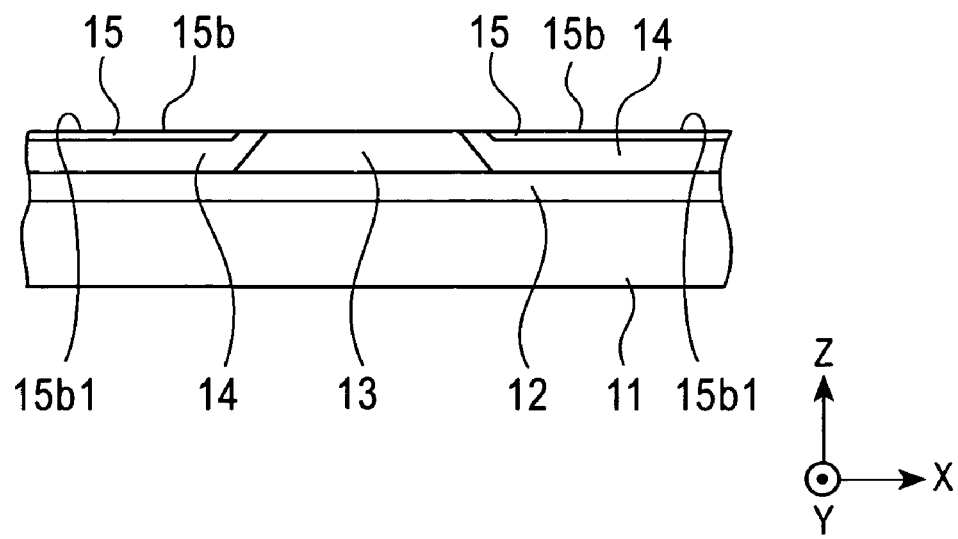
FIG. 21 is a drawing showing a step after the step shown in FIG. 20.

Next, portions of the third and first insulating layers 132 and 111, which are disposed above the main magnetic pole 110, are cut to D—D line in FIG. 16A by the CMP process to expose the upper surface 110*c* of the main magnetic pole 110. At the same time, the upper surface 110*c* of the main magnetic pole 110, the upper surface 132*a* of the third insulating layer 132, and the upper surface of the first insulating layer 111 are planarized to form a planarized surface 340. FIGS. 17A and 17B show the state after the CMP process.

In the present invention, the polishing step shown in FIGS. 16A and 16B is finished using the second insulating layer 131 as a marker, i.e., a stopper. Since the second insulating layer 131 is deposited by a thin film technique such as a sputtering method, the thickness of the second insulating layer 131 can be precisely controlled. Namely, the position of the second insulating layer 131 in the thickness direction can be precisely determined, and thus the amount of polishing can be precisely controlled by polishing to the position of the second insulating layer 131.

Since the upper surface 110*c* of the main magnetic pole 110 is coplanar with the upper surface 132*a* of the third insulating layer 132, the thickness dimension Ht of the main magnetic pole 110 can be also precisely controlled.

In the present invention, the materials for the second and third insulating layers 131 and 132 are selected so that the polishing rate of the second insulating layer 131 is lower than that of the third insulating layer 132 under the same polishing conditions. Namely, the materials are selected so that the CMP rate or etching rate of the second insulating layer 131 is lower than that of the third insulating layer 132 under the same polishing conditions.

For example, when the third insulating layer 132 formed using alumina ($Al_2O_3$) and the second insulating layer 131 formed using $SiO_2$ are polished under the same conditions, the polishing rate of the second insulating layer 131 is about 1/20 of that of the third insulating layer 132. As a result, the polishing step shown in FIGS. 16A and 16B can be securely and easily stopped at the position of the second insulating layer 131.

When the material for the third insulating layer 132 is selected so that the polishing rate thereof is higher than that of the second insulating layer 131 under the same polishing conditions, the time required for polishing can be decreased.

In the present invention, as shown in FIGS. 16A and 16B, the second insulating layer 131 is not formed on the protruding portion 132b of the third insulating layer 132. Therefore, in the CMP step shown in FIGS. 16A and 16B, only the third insulating layer 132 can be cut until the planarized surface 340 shown in FIG. 17 is formed. Therefore, the second insulating layer 131 functioning as the stopper layer and having a lower CMP rate or etching rate than that of the third insulating layer 132 is not cut in the CMP process.

If the second and third insulating layers 131 and 132 are simultaneously cut, the third insulating layer 132 having a higher CMP rate or etching rate is more rapidly cut than the second insulating layer 131 having a lower CMP rate or etching rate, thereby causing difficult in forming the same planarized surface by the second and third insulating layers 131 and 132.

However, in the present invention, the third insulating layer 132 need not necessarily be cut at the same time as the second insulating layer 131 having a lower CMP rate or etching rate, and thus the planarized surface 340 can be easily and precisely formed, and the thickness dimension Ht of the main magnetic pole 110 can be precisely controlled.

Therefore, the method for manufacturing the magnetic head of the present invention is capable of precisely controlling the thickness dimension Ht of the main magnetic pole 110, thereby uniformizing the recording characteristics of the magnetic head, such as overwrite characteristics.

Since the thickness dimension Ht of the main magnetic pole 110 can be precisely controlled, in the magnetic head, the recording track width on the recording medium can be constantly kept in the predetermined standard range even if a skew angle occurs.

The method for forming the main magnetic pole shown in FIGS. 16 and 17 can be applied to the formation of the main magnetic pole in the magnetic head H2 shown in FIGS. 11 to 14.

In the present invention, a coil layer may be formed in a spiral shape wound around an axis at the connecting portion 116b or the connecting layer 225 for connecting the main magnetic pole 110 to the return path layer 116 or 216.

Although the present invention is described above with reference to the preferred embodiments, various changes can be made in the scope of the present invention.

The above-described embodiments are only embodiments, and the scope of the claims of the present invention is not limited by the embodiments.

What is claimed is:

1. A method for manufacturing a magnetic head comprising the steps of:
    (a) forming a magnetic pole layer using a magnetic material;
    (b) providing a first insulating layer over both sides and an upper surface of the magnetic pole layer to form a protruding portion, which covers the magnetic pole layer, and a flat portion disposed around the protruding portion;
    (c) laminating a second insulating layer on the flat portion of the first insulating layer;
    (d) laminating a third insulating layer on the first and second insulating layers;
    (e) polishing the third insulating layer and the protruding portion of the first insulating layer to expose the upper surface of the magnetic pole layer and so that the upper surface of the magnetic pole layer is coplanar with an upper surface of the second insulating layer; and
    (f) forming a coil layer above or below the magnetic pole layer.

2. The method according to claim 1, further comprising a step (g) of forming a return-path layer comprising a magnetic material on the magnetic pole layer with a gap layer provided therebetween before the step (a) or after the step (e).

3. The method according to claim 1, further comprising a step (g) of removing the second insulating layer after the step (e).

4. The method according to claim 1, further comprising polishing the first, second, and third insulating layers under the same polishing conditions, where a polishing rate of the second insulating layer is lower than polishing rates of the first and second insulating layers.

5. The method according to claim 1, wherein each of the first and third insulating layers comprises alumina ($Al_2O_3$), and the second insulating layer comprises at least one of $SiO_2$, Al—Si—O, Al—Si—O—N, SiN, W, Ti, Ta, TaN, WTi, Mo, CrN, BN, $B_4C$, and DLC (diamond like carbon).

6. The method according to claim 1, wherein each of the first and third insulating layers comprises at least one of $SiO_2$ and Al—Si—O, and the second insulating layer comprises at least one of W, Ti, Ta, TaN, WTi, Mo, CrN, BN, $B_4C$, and DLC (diamond like carbon).

* * * * *